US009628780B2

(12) United States Patent
Suh et al.

(10) Patent No.: US 9,628,780 B2
(45) Date of Patent: Apr. 18, 2017

(54) DEVICE AND METHOD FOR RECEIVING DIGITAL BROADCAST SIGNAL

(75) Inventors: Jongyeul Suh, Seoul (KR); Jeehyun Choe, Seoul (KR); Jinpil Kim, Seoul (KR); Kwansuk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 678 days.

(21) Appl. No.: 13/992,094

(22) PCT Filed: Dec. 8, 2011

(86) PCT No.: PCT/KR2011/009458
§ 371 (c)(1),
(2), (4) Date: Dec. 18, 2013

(87) PCT Pub. No.: WO2012/077987
PCT Pub. Date: Jun. 14, 2012

(65) Prior Publication Data
US 2014/0125780 A1 May 8, 2014

Related U.S. Application Data

(60) Provisional application No. 61/421,194, filed on Dec. 8, 2010, provisional application No. 61/446,504, filed
(Continued)

(51) Int. Cl.
*H04N 13/04* (2006.01)
*H04N 13/00* (2006.01)
(Continued)

(52) U.S. Cl.
CPC ........ *H04N 13/04* (2013.01); *H04N 13/0048* (2013.01); *H04N 13/0059* (2013.01);
(Continued)

(58) Field of Classification Search
None
See application file for complete search history.

(56) References Cited

U.S. PATENT DOCUMENTS

| 5,619,256 A * | 4/1997 | Haskell ............. H04N 13/0048 348/43 |
| 2003/0146883 A1* | 8/2003 | Zelitt .................... G09G 3/003 345/6 |

(Continued)

FOREIGN PATENT DOCUMENTS

| CN | 1954606 A | 4/2007 |
| CN | 101212678 A | 7/2008 |

(Continued)

OTHER PUBLICATIONS

WO 2010/053246 A2—Yun et al.*

*Primary Examiner* — Geepy Pe
*Assistant Examiner* — Janese Duley
(74) *Attorney, Agent, or Firm* — Dentons US LLP

(57) ABSTRACT

The present invention relates to a device and method for receiving digital broadcast signals including three-dimensional images. The method for receiving digital broadcast signals, according to one embodiment of the present invention, comprises: a first receiving unit for receiving digital broadcast signals including signaling data and video stream at a reference time; a signaling data processor for decoding information, which is included in the signaling data, and which is related to video stream at an additional time for realizing three-dimensional images in conjunction with the video stream at a reference time; a second receiving unit for receiving digital broadcast signals including video stream at an additional time, using the information related to the video stream at an additional time; a base view video decoder for decoding the received video stream at a reference time and generating a base view video; and additional image decoder (Continued)

for decoding the received video stream at an additional time and generating an additional image; and an output formatter for outputting stereoscopic, three-dimensional image signals by combining the base view video and the additional image.

12 Claims, 52 Drawing Sheets

Related U.S. Application Data on Feb. 25, 2011, provisional application No. 61/453,126, filed on Mar. 15, 2011, provisional application No. 61/453,136, filed on Mar. 16, 2011, provisional application No. 61/467,368, filed on Mar. 24, 2011.

(51) Int. Cl.
*H04N 21/2343* (2011.01)
*H04N 21/434* (2011.01)
*H04N 21/81* (2011.01)

(52) U.S. Cl.
CPC . *H04N 21/234327* (2013.01); *H04N 21/4345* (2013.01); *H04N 21/4347* (2013.01); *H04N 21/816* (2013.01); *H04N 13/0066* (2013.01)

(56) References Cited

U.S. PATENT DOCUMENTS

| | | |
|---|---|---|
| 2009/0245347 A1 | 10/2009 | Lee |
| 2010/0110163 A1 | 5/2010 | Bruls et al. |
| 2011/0012992 A1* | 1/2011 | Luthra ............... H04N 13/0048 348/43 |

FOREIGN PATENT DOCUMENTS

| | | |
|---|---|---|
| CN | 101690194 A | 3/2010 |
| CN | 101816179 A | 8/2010 |
| KR | 10-2005-0111379 A | 11/2005 |
| WO | 2005-114998 A1 | 12/2005 |
| WO | WO 2010-079921 A2 | 7/2010 |
| WO | 2010-090462 A2 | 8/2010 |
| WO | 2010-120804 A1 | 10/2010 |

* cited by examiner

FIG. 2

| Syntax | Bits | Format |
|---|---|---|
| component_list_descriptor () { | | |
|     descriptor_tap | 8 | uimsbf |
|     descriptor_length | 8 | uimsbf |
|     alternate | 1 | bslbf |
|     component_count | 7 | uimsbf |
|     for (i=0; i<component_count; i++) { | | |
|         stream_type | 8 | uimsbf |
|         format_identifier | 32 | uimsbf |
|         length_of_details | 8 | uimsbf |
|         stream_info_details | var | |
|     } | | |
| } | | |

FIG. 3

| Syntax | No. of bits | Format |
|---|---|---|
| Stream_info_details ( ) { | | |
|     Stream_info_type | 8 | uimsbf |
|     reserved | 3 | '111' |
|     elementary_PID | 13 | uimsbf |
|     SLD_element_index | 8 | uimsbf |
|     reserved | 3 | '111' |
|     base_video_flag | 1 | bslbf |
|     leftview_flag | 1 | bslbf |
|     upsampling_factor | 3 | uimsbf |
| } | | |

(a)

| Value | Description |
|---|---|
| 000 | reserved |
| 001 | base video and enhancement video have the same resolution |
| 010 | resolution of enhancement video has 1/2 resolution of base video in horizontal direction |
| 011 | resolution of enhancement video has 1/2 resolution of base video in vertical direction |
| 100 | resolution of enhancement video has 1/2 resolution of base video in horizontal and vertical direction |
| 101~111 | reserved |

| Syntax | No. of bits | Format |
|---|---|---|
| Stream_info_details ( ) { | | |
|     Stream_info_type | 8 | uimsbf |
|     reserved | 3 | '111' |
|     elementary_PID | 13 | uimsbf |
|     SLD_element_index | 8 | uimsbf |
|     stereo_video_format | 8 | uimsbf |
| } | | |

(a)

| stereo_video_format | Meaning |
|---|---|
| 0000011 | side by side |
| 0000100 | top and bottom |
| 0001000 | 2D video |
| other values | undefined |

| Syntax | No. of bits | Format |
|---|---|---|
| TS_program_map_section () { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i=0; i<N; i++) { | | |
|     descriptor() | | |
|   } | | |
|   for (i=0; i<N1; i++) { | | |
|     stream_type | 8 | uimsbf |
|     reserved | 3 | bslbf |
|     elementary_PID | 13 | uimsbf |
| | | uimsbf |
|     reserved | 4 | bslbf |
|     ES_info_length | 12 | bslbf |
|     for (i=0; i<N2; i++) { | | |
|       descriptor() | | |
|     } | | |
|   } | | |
|   CRC_32 | 32 | rpchof |
| } | | | possible location of 3D_service_descriptor ( )

FIG. 9

| Syntax | No. of bits | Format |
|---|---|---|
| 3D_service_descriptor ( ) { | | |
|    descriptor_tag | 8 | 0xTBD |
|    descriptor_length | 8 | uimsbf |
|   Reserved | 5 | bslbf |
|    program_combine_type | 3 | uimsbf |
|   if (program_combine_type==001 \|\| program_combine_type==010) { | | |
|     linked_TSID | 16 | uimsbf |
|     linked_program_number | 16 | uimsbf |
|   } | | |
|   else if (program_combine_type==011 \|\| program_combine_type==100) { | | |
|     internet_linkage_information ( ) | | |
|   } | | |
| } | | |

FIG. 10 program_combine_type

| Field | Meaning |
|---|---|
| 000 | This program contains all necessary components of a service (e.g. - left and right images are all carried in this program) |
| 001 | This program contains part of components of a service and contains the essential element of a service. In worst case, this program can render a part of service with reduced capability. (e.g. - 2D service using base video) The other components of a complete service is carried in the same type of media as this program and can be obtained by referencing linked_TSID, linked_program_number. |
| 010 | This program contains part of components of a service and does not contain the essential element of a service. This program alone does not provide any meaningful presentation to the user. This program should be combined with the essential elements carried in other program referenced by linked_TSID, linked_program_number. The essential elements are carried in the same type of delivery media as this program. |
| 011 | This program contains part of components of a service and contains the essential element of a service. In worst case, this program can render a part of service with reduced capability. The other components of a complete service is carried through internet and the URL for the additional stream can be obtained by referencing internet_linkage_information. |
| 100 | This program contains part of components of a service and does not contain the essential element of a service. This program alone does not provide any meaningful presentation to the user. The essential elements are carried through the internet delivery. This program should be combined with the essential elements carried through the internet. The access information for the essential elements is obtained in internet_linkage_information. |

FIG. 11

| Syntax | No. of bits | Format |
|---|---|---|
| 3D_service_descriptor ( ) { | | |
| descriptor_tag | 8 | 0xTBD |
| descriptor_length | 8 | uimsbf |
| reserved | 5 | bslbf |
| program_combine_type | 3 | uimsbf |
| Reserved | 5 | '11111' |
| event_sync_type | 3 | uimsbf |
| if(program_combine_type==001 \| program_combine_type==010) { | | |
| linked_TSID | 16 | uimsbf |
| linked_program_number | 16 | uimsbf |
| } | | |
| else if (program_combine_type==011 \| program_combine_type==100) { | | |
| internet_linkage_information ( ) | | |
| } | | |
| } | | |

FIG. 12 event_sync_type

| Field | Meaning |
|---|---|
| 000 | Only synchronous 3D delivery is possible for the 3D service. |
| 001 | Only asynchronous 3D delivery is possible for the 3D service. Part of 3D service referenced by linked information (linked_TSID, linked_program_number) is delivered afterwards. |
| 010 | Only asynchronous 3D delivery is possible for the 3D service. Part of 3D service referenced by linked information (linked_TSID, linked_program_number) was previously delivered. |
| 011 | Both synchronous and asynchronous 3D deliveries are possible. Part of 3D service referenced by linked information (linked_TSID, linked_program_number) is re-delivered afterwards and it is simultaneously delivered with current event as well. |
| 100 | Both synchronous and asynchronous 3D deliveries are possible. Part of 3D service referenced by linked information (linked_TSID, linked_program_number) was already delivered and it is simultaneously delivered with current event as well. |

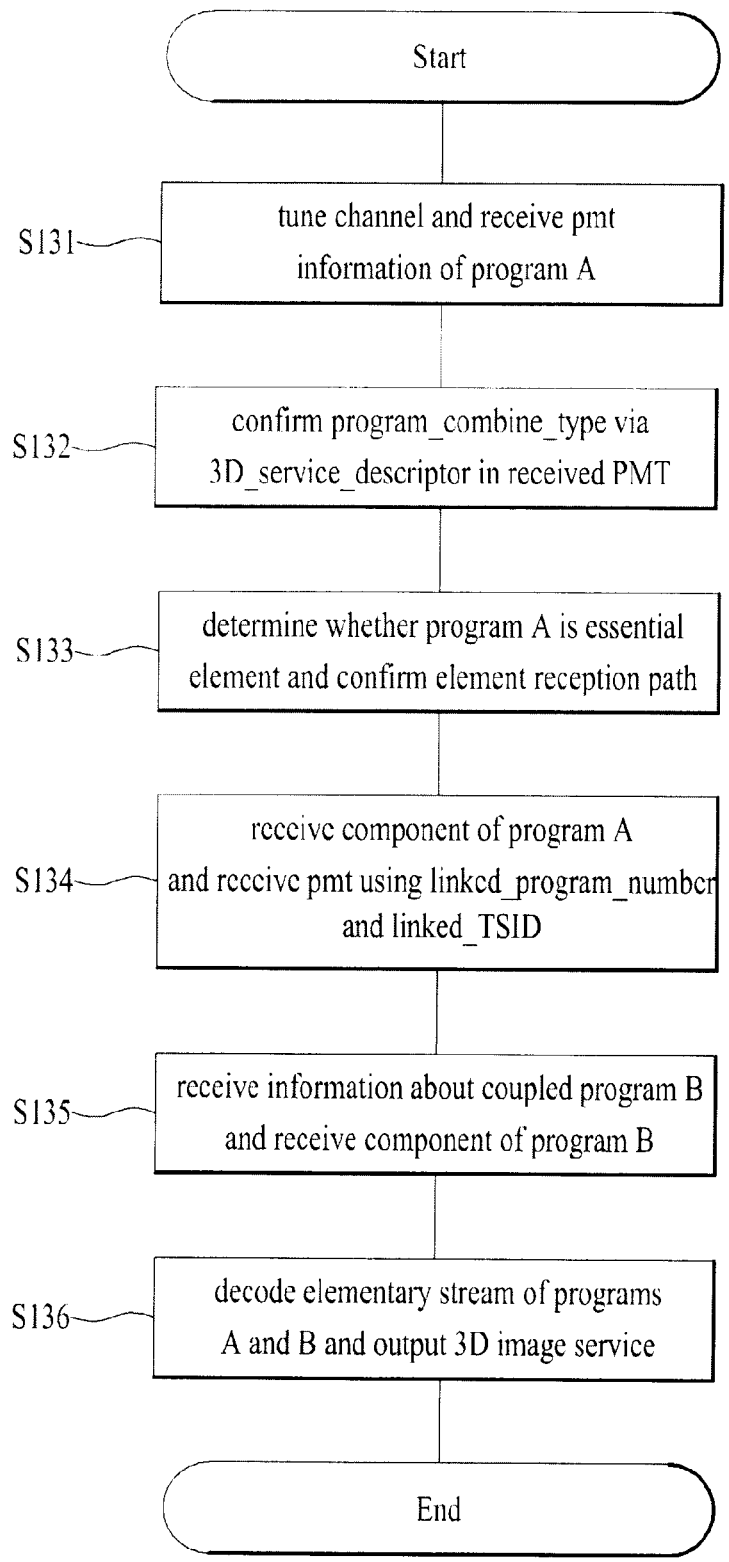

FIG. 14

| Syntax | No. of bits | Format |
|---|---|---|
| terrestrial_virtual_channel_table_section () { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_chnnels_in_section | 8 | uimsbf |
|   for (i=0; i<num_channels_insection; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequnecy | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor() | | |
|     } | | |
|   } | | |
|   reserved | 6 | '111111' |
|   additional_descriptor_length | 10 | uimsbf |
|   for (i=0; i<N; i++) { | | |
|     additional_descriptor() | | |
|   } | | |
|   CRC_32 | 32 | rpchof |
| } | | | descriptor() — possible location of channel_combine descriptor()

FIG. 15

| Syntax | No. of bits | Format |
|---|---|---|
| channel_combine_descriptor ( ) { | | |
|     descriptor_tag | 8 | 0xTBD |
|     descriptor_length | 8 | uimsbf |
|     reserved | 5 | bslbf |
|     channel_combine_type | 3 | uimsbf |
|     if(channel_combine_type==001 \|\| channel_combine_type==010) { | | |
|         associated_channel_TSID | 16 | uimsbf |
|         associated_channel_program_number | 16 | uimsbf |
|         reserved | 4 | '1111' |
|         associated_major_channel_number | 10 | Uimsbf |
|         associated_minor_channel_number | 10 | Uimsbf |
|         associated_source_id | 16 | uimsbf |
|     } | | |
|     else if(channel_combine_type==011 \|\| channel_combine_type==100) { | | |
|         internet_linkage_information ( ) | | |
|     } | | |
| } | | | channel_combine_type  FIG. 16

| Field | Meaning |
|---|---|
| 000 | This channel contains all necessary components of a service (e.g. - left and right images are all carried in this program) |
| 001 | This channel contains part of components of a service and contains the essential element of a service. In worst case, this channel can render a part of service with reduced capability. (e.g. - 2D service using base video) The other components of a complete 3D service are carried in the same type of media as this program and can be obtained by referencing associated_channel_TSID, associated_channel_program_number, associated_major_channel_number, associated_minor_channel_number, and associated_source_id. (base video channel) |
| 010 | This channel contains part of components of a service and does not contain the essential element of a service. This channel alone does not provide any meaningful presentation to the user. This channel should be combined with the essential elements carried in other channel referenced by associated_channel_TSID, associated_channel_program_number, associated_major_channel_number, associated_minor_channel_number, and associated_source_id. The essential elements are carried in the same type of delivery media as this channel. (enhancement video channel) |
| 011 | This channel contains part of components of a service and contains the essential element of a service. In worst case, this channel can render a part of service with reduced capability. (such as 2D) The other components of a complete service are carried through internet end the URL for the additional stream can be obtained by referencing internet_linkage_information. |
| 100 | This channel contains part of components of a service and does not contain the essential element of a service. This program alone does not provide any meaningful presentation to the user. The essential elements are carried through the internet delivery. This program should be combined with the essential elements carried through the internet. The access information for the essential elements is obtained in internet_linkage_information. |

FIG. 17

| Syntax | No. of bits | Format |
|---|---|---|
| channel_combine_descriptor ( ) { | | |
|    descriptor_tag | 8 | 0xTBD |
|    descriptor_length | 8 | uimsbf |
|    reserved | 5 | bslbf |
|    channel_combine_type | 3 | uimsbf |
|    reserved | 5 | '1111' |
|    channel_sync_type | 3 | uimsbf |
|    if(channel_combine_type==001 \|\| channel_combine_type==010) { | | |
|       associated_channel_TSID | 16 | uimsbf |
|       associated_channel_program_number | 16 | uimsbf |
|       reserved | 4 | '1111' |
|       associated_major_channel_number | 10 | Uimsbf |
|       associated_minor_channel_number | 10 | Uimsbf |
|       associated_source_id | 16 | uimsbf |
|    } | | |
|    else if(channel_combine_type==011 \|\| channel_combine_type==100) { | | |
|       internet_linkage_information ( ) | | |
|    } | | |
| } | | |

FIG. 18 channel_sync_type

| Field | Meaning |
|---|---|
| 000 | Only synchronous 3D delivery is possible for the 3D service. |
| 001 | Only asynchronous 3D delivery is possible for the 3D service. Part of 3D service referenced by linked information (associated_channel_TSID, associated_channel_program_number, associated_major_channel_number, associated_minor_channel_number, associated_source_id, and internet_linkage_information) is delivered afterwards. |
| 010 | Only asynchronous 3D delivery is possible for the 3D service. Part of 3D service referenced by linked information (associated_channel_TSID, associated_channel_program_number, associated_major_channel_number, associated_minor_channel_number, associated_source_id, and internet_linkage_information) was previously delivered. |
| 011 | Both synchronous and asynchronous 3D deliveries are possible. Part of 3D service referenced by linked information (associated_channel_TSID, associated_channel_program_number, associated_major_channel_number, associated_minor_channel_number, associated_source_id, and internet_linkage_information) is re-delivered afterwards and it is simultaneouslydelivered with current event as well. |
| 100 | Both synchronous and asynchronous 3D deliveries are possible. Part of 3D service referenced by linked information (associated_channel_TSID, associated_channel_program_number, associated_major_channel_number, associated_minor_channel_number, associated_source_id, and internet_linkage_information) was already delivered and it is simultaneously delivered with current event as well. |

FIG. 20

| Syntax | No. of bits | Format |
|---|---|---|
| event_information_table_section () { | | |
|    table_id | 8 | 0xC8 |
|    section_syntax_indicator | 1 | '1' |
|    private_indicator | 1 | '1' |
|    reserved | 2 | '11' |
|    section_length | 12 | uimsbf |
|    source_id | 16 | uimsbf |
|    reserved | 2 | '11' |
|    version_number | 5 | uimsbf |
|    current_next_indicator | 1 | '1' |
|    section_number | 8 | uimsbf |
|    last_section_number | 8 | uimsbf |
|    protocol_version | 8 | uimsbf |
|    num_events_in_section | 8 | uimsbf |
|    for (j=0; j<num_events_in_section; j++) { | | |
|       reserved | 2 | '11' |
|       event_id | 14 | uimsbf |
|       start_time | 32 | uimsbf |
|       reserved | 2 | '11' |
|       ETM_location | 2 | uimsbf |
|       length_in_seconds | 20 | uimsbf |
|       title_length | 8 | uimsbf |
|       title_text ( ) | var | |
|       reserved | 4 | '1111' |
|       descriptors_length | 12 | |
|       for (i = 0; i < N; i++) { | | |
|          descriptor() | | |
|       } | | |
|    } | | |
|    CRC_32 | 32 | rpchof |
| } | | | possible location of event_combine_descriptor()

FIG. 21

| Syntax | No. of bits | Format |
|---|---|---|
| event_combine_descriptor ( ) { | | |
| descriptor_tag | 8 | 0xTBD |
| descriptor_length | 8 | uimsbf |
| Reserved | 5 | bslbf |
| event_combine_type | 3 | uimsbf |
| if (event_combine_type==001 || event_combine_type==010) { | | |
| linked_TSID | 16 | uimsbf |
| linked_program_number | 16 | uimsbf |
| } | | |
| else if (event_combine_type==011 || event_combine_type==100) { | | |
| internet_linkage_information ( ) | | |
| } | | |
| } | | |

FIG. 22 event_combine_type

| Field | Meaning |
|---|---|
| 000 | This event contains all necessary components of a service (e.g. - left and right images are all carried in this program) |
| 001 | This event contains part of components of a service and contains the essential element of of a service. In worst case, this event can render a part of service with reduced capability. (e.g. - 2D service using base video) The other components of a complete service is carried in the same type of media as this event and can be obtained by referencing linked_TSID, linked_program_number. |
| 010 | This event contains part of components of a service and does not contain the essential element of a service. This event alone does not provide any meaningful presentation to the user. This event should be combined with the essential elements carried in other program referenced by linked_TSID, linked_program_number. The essential elements are carried in the same type of of delivery media as this event. |
| 011 | This event contains part of components of a service and contains the essential element of a service. In worst case, this event can render a part of service with reduced capability. The other components of a complete service is carried through internet and the URL for the additional stream can be obtained by referencing internet_linkage_information. |
| 100 | This event contains part of components of a service and does not contain the essential element of a service. This event alone does not provide any meaningful presentation to the user. The essential elements are carried through the internet delivery. This event should be combined with the essential elements carried through the internet. The access information for the essential elements is obtained in internet_linkage_information. |

FIG. 23

| Syntax | No. of bits | Format |
|---|---|---|
| event_combine_descriptor ( ) { | | |
| descriptor_tag | 8 | 0xTBD |
| descriptor_length | 8 | uimsbf |
| reserved | 5 | bslbf |
| event_combine_type | 3 | uimsbf |
| reserved | 5 | '1111' |
| event_sync_type | 3 | uimsbf |
| if (event_combine_type==001 \|\| event_combine_type==011) { | | |
| avail_time_start | 32 | uimsbf |
| } | | |
| if (event_combine_type==001 \|\| event_combine_type==010) { | | |
| linked_TSID | 16 | uimsbf |
| linked_program_number | 16 | uimsbf |
| } | | |
| else if (event_combine_type==011 \|\| event_combine_type==100) { | | |
| internet_linkage_information ( ) | | |
| } | | |
| } | | |

FIG. 24

| Syntax | No. of bits | Format |
|---|---|---|
| Stream_info_details ( ) { | | |
|     Stream_info_type | 8 | uimsbf |
|     reserved | 3 | '111' |
|     elementary_PID | 13 | uimsbf |
|     SLD_element_index | 8 | uimsbf |
|     reserved | 5 | '111' |
|     audio_type | 3 | uimsbf |
|     ISO_639_language_code | 24 | uimsbf |
| } | | |

(a)

| Value | Description |
|---|---|
| 000 | Reserved |
| 001 | audio stream transmitted via enhancement video channel is used in 3D service and audio stream transmitted via base video channel is not used. |
| 010 | audio stream transmitted via base video channel is used as base stream and audio stream transmitted via enhancement video channel is used enhancement stream. (in MPEG surround) |
| 011 | audio stream having another language is transmitted via enhancement video channel and language information refers to ISO 639 language code appearing after audio_type field |
| 100~111 | reserved |

| Syntax | No. of bits | Mnemonic |
|---|---|---|
| service_description_section ( ) { | | |
|    table_id | 8 | uimsbf |
|    section_syntax_indicator | 1 | bslbf |
|    reserved_future_use | 1 | bslbf |
|    reserved | 2 | bslbf |
|    section_length | 12 | uimsbf |
|    transport_stream_id | 16 | uimsbf |
|    reserved | 2 | bslbf |
|    version_number | 5 | uimsbf |
|    current_next_indicator | 1 | bslbf |
|    section_number | 8 | uimsbf |
|    last_section_number | 8 | uimsbf |
|    original_network_id | 16 | uimsbf |
|    reserved_future_use | 8 | bslbf |
|    for (i = 0; i < N; i++) { | | |
|      service_id | 16 | uimsbf |
|      reserved_future_use | 6 | bslbf |
|      EIT_schedule_flag | 1 | bslbf |
|      EIT_present_following_flag | 1 | bslbf |
|      running_status | 3 | uimsbf |
|      free_CA_mode | 1 | bslbf |
|      descriptors_loop_length | 12 | uimsbf |
|      for (i = 0; i < N; i++) { | | |
|        descriptor ( ) | | |
|      } | | |
|    } | | |
|    CRC_32 | 32 | rpchof |
| } | | | possible location of service_combine_descriptor()

FIG. 27

| Syntax | No. of bits | Format |
|---|---|---|
| service_combine_descriptor ( ) { | | |
| descriptor_tag | 8 | 0xTBD |
| descriptor_length | 8 | uimsbf |
| reserved | 5 | bslbf |
| service_combine_type | 3 | uimsbf |
| reserved | 5 | bslbf |
| service_sync_type | 3 | uimsbf |
| if (service_combine_type==001 \|\| service_combine_type==010) { | | |
| associated_service_TSID | 16 | uimsbf |
| associated_service_original_network_id | 16 | uimsbf |
| associated_service_id | 16 | uimsbf |
| } | | |
| else if (service_combine_type==011 \|\| service_combine_type==100) { | | |
| internet_linkage_information ( ) | | |
| } | | |
| } | | |

FIG. 28 service_combine_type

| Field | Meaning |
|---|---|
| 000 | This service contains all necessary components of a service (e.g. - left and right images are all carried in this service) |
| 001 | This service contains part of components of a service and contains the essential element of a service. In worst case, this service can render a part of service with reduced capability. (e.g. - (e.g. - 2D service using base video) The other components of a complete service is carried in the 2D service using base video) The other components of a complete 3D service are carried in the same type of media as this program and can be obtained by referencing associated_service_TSID, associated_service_original_network_id, and associated_service_id. |
| 010 | This service contains part of components of a service and does not contain the essential element of a service. This service alone does not provide any meaningful presentation to the user. This service should be combined with the essential elements carried in other service referenced by associated_service_TSID, associated_service_original_network_id, and associated_service_id The essential elements are carried in the same type of delivery media as this channel. |
| 011 | This service contains part of components of a service and contains the essential element of a service. In worst case, this service can render a part of service with reduced capability. The other components of a complete service is carried through internet and the URL for the additional stream can be obtained by referencing internet_linkage_information. |
| 100 | This channel contains part of components of a service and does not contain the essential element of a service. This service alone does not provide any meaningful presentation to the user. The essential elements are carried through the internet delivery. This service should be combined with the essential elements carried through the internet. The access information for the essential elements is obtained in internet_linkage_information. |

FIG. 29 service_sync_type

| Field | Meaning |
|---|---|
| 000 | Only synchronous 3D delivery is possible for the 3D service. |
| 001 | Only asynchronous 3D delivery is possible for the 3D service. Part of 3D service referenced by linked information (associated_service_TSID, associated_service_original_network_id, associated_service_id, and internet_linkage_information) is delivered afterwards. |
| 010 | Only asynchronous 3D delivery is possible for the 3D service. Part of 3D service referenced by linked information (associated_service_TSID, associated_service_original_network_id, associated_service_id, and internet_linkage_information) was previously delivered. |
| 011 | Both synchronous and asynchronous 3D deliveries are possible. Part of 3D service referenced by linked information (associated_service_TSID, associated_service_original_network_id, associated_service_id, and internet_linkage_information) is re-delivered afterwards and it is simultaneously delivered with current event as well. |
| 100 | Both synchronous and asynchronous 3D deliveries are possible. Part of 3D service referenced by linked information (associated_service_TSID, associated_service_original_network_id, associated_service_id, and internet_linkage_information) was already delivered and it is simultaneously delivered with current event as well. |

FIG. 31

| Syntax | No. of bits | Mnemonic |
|---|---|---|
| event_information_section ( ) { | | |
|    table_id | 8 | uimsbf |
|    section_syntax_indicator | 1 | bslbf |
|    reserved_future_use | 1 | bslbf |
|    reserved | 2 | bslbf |
|    section_length | 12 | uimsbf |
|    service_id | 16 | uimsbf |
|    reserved | 2 | bslbf |
|    version_number | 5 | uimsbf |
|    current_next_indicator | 1 | bslbf |
|    section_number | 8 | uimsbf |
|    last_section_number | 8 | uimsbf |
|    transport_stream_id | 16 | uimsbf |
|    original_network_id | 16 | uimsbf |
|    segment_last_section_number | 8 | uimsbf |
|    last_table_id | 8 | uimsbf |
|    for (i = 0; i < N; i++) { | | |
|       event_id | | |
|       start_time | 16 | uimsbf |
|       duration | 40 | bslbf |
|       runinng_status | 24 | uimsbf |
|       free_CA_mode | 3 | uimsbf |
|       descriptors_loop_length | 1 | bslbf |
|       for (i = 0; i < N; i++) { | 12 | uimsbf |
|          descriptor ( ) | | |
|       } | | |
|    } | | |
|    CRC_32 | 32 | rpchof |
| } | | | possible location of event_combine_descriptor()

FIG. 32

| Syntax | No. of bits | Format |
|---|---|---|
| event_combine_descriptor | | |
| descriptor_tag | 8 | 0xTBD |
| descriptor_length | 8 | uimsbf |
| reserved | 5 | bslbf |
| event_combine_type | 3 | uimsbf |
| if(event_combine_type==001 || event_combine_type==010) { | | |
| linked_event_id | 16 | uimsbf |
| linked_TSID | 16 | uimsbf |
| linked_original_network_id | 16 | uimsbf |
| linked_service_id | 16 | uimsbf |
| } | | |
| else if(event_combine_type==011 || event_combine_type==100) { | | |
| internet_linkage_information () | | |
| } | | |
| reserved | 5 | '11111' |
| event_sync_type | 3 | uimsbf |
| if(event_combine_type==011 || event_combine_type==100) { | | |
| avail_time_start | 32 | uimsbf |
| } | | |
| } | | |

FIG. 33

| Field | Meaning |
|---|---|
| 000 | This event contains all necessary components of a service (e.g. - left and right images are all carried in this program) |
| 001 | This event contains part of components of a service and contains the essential element of a service. In worst case, this program can render a part of service with reduced capability. (e.g. - 2D service using base video) The other components of a complete service is carried in the same type of media as this program and can be obtained by referencing linked_TSID, linked_service_id. |
| 010 | This event contains part of components of a service and does not contain the essential element of a service. This program alone does not provide any meaningful presentation to the user. This program should be combined with the essential elements carried in other program referenced by linked_TSID, linked_service_id. The essential elements are carried in the same type of delivery media as this program. |
| 011 | This event contains part of components of a service and contains the essential element of a service. In worst case, this program can render a part of service with reduced capability. The other components of a complete service is carried through internet and the URL for the additional stream can be obtained by referencing internet_linkage_information. |
| 100 | This event contains part of components of a service and does not contain the essential element of a service. This program alone does not provide any meaningful presentation to the user. The essential elements are carried through the internet delivery. This program should be combined with the essential elements carried through the internet. The access information for the essential elements is obtained in internet_linkage_information. |

FIG. 34 event_sync_type

| Field | Meaning |
|---|---|
| 000 | Only synchronous 3D delivery is possible for the 3D service. |
| 001 | Only asynchronous 3D delivery is possible for the 3D service. Part of 3D service referenced by linked information (linked_event_id, linked_TSID, linked_service_id, linked_original_network_id, and internet_linkage_information) is delivered afterwards. |
| 010 | Only asynchronous 3D delivery is possible for the 3D service. Part of 3D service referenced by inked information (linked_event_id, linked_TSID, linked_service_id, linked_original_network_id, and internet_linkage_information) was previously delivered. |
| 011 | Both synchronous and asynchronous 3D deliveries are possible. Part of 3D service referenced by linked information (linked_event_id, linked_TSID, linked_service_id, linked_original_network_id, and internet_linkage_information) is re-delivered afterwards and it is simultaneously delivered with current event as well. |
| 100 | Both synchronous and asynchronous 3D deliveries are possible. Part of 3D service referenced by linked information (linked_event_id, linked_TSID, linked_service_id, linked_original_network_id, and internet_linkage_information) was already delivered and it is simultaneously delivered with current event as well. |

FIG. 36

| Syntax | No. of bits | Format |
|---|---|---|
| linkage_descriptor ( ) { | | |
|     descriptor_tag | 8 | uimsbf |
|     descriptor_length | 8 | uimsbf |
|     transport_stream_id | 16 | uimsbf |
|     original_network_id | 16 | uimsbf |
|     service_id | 16 | uimsbf |
|     linkage_type | 8 | uimsbf |
|     .<br>    .<br>    .<br>    (linkage_type == 0x0F) {<br>        service_combine_info()<br>    } else if (linkage_type == 0x10) {<br>        event_combine_info()<br>    }<br><br>    for (i=0;i<N;i++){<br>        private_data_byte<br>    }<br>} | | |

(a)

| linkage_type | Description | |
|---|---|---|
| 0x0F | Service combine linkage ( | · linkage descriptor is located in SDT |
| 0x10 | Event combine linkage ( | · linkage descriptor is located in EIT |

| service_type | Description |
|---|---|
| 0x19 | Advanced codec HD digital television service |
| 0x1F | Non-essential stereoscopic service carrying only additional video stream |

(a)

| stream_content | component_type | Description |
|---|---|---|
| 0x01 | 0x11 | MPEG-2 video, non-essential 3D video, 25Hz |
| 0x01 | 0x12 | MPEG-2 video, non-essential 3D video, 30Hz |
| 0x05 | 0x84 | H.264/AVC video, non-essential 3D video, 25Hz |
| 0x05 | 0x85 | H.264/AVC video, non-essential 3D video, 30Hz |
| 0x05 | 0x86 | Enhancement layer, (enhancement to frame-compatible 3D service), 25Hz |
| 0x05 | 0x87 | Enhancement layer, (enhancement to frame-compatible 3D service), 30Hz |
| 0x05 | 0x88 | MVC enhancement layer, (enhancement to service-compatible 3D service), 25Hz |
| 0x05 | 0x89 | MVC enhancement layer, (enhancement to service-compatible 3D service), 30Hz |

(b)

| service_type | Description |
|---|---|
| 0x19 | Advanced codec HD digital television service |
| 0x20 | Dual-stream stereoscopic service carrying both based and additional video streams |

| Syntax | No. of bits | Format |
|---|---|---|
| event_enhancement_descriptor ( ) { | | |
|     descriptor_tag | 8 | 0xTBD |
|     descriptor_length | 8 | uimsbf |
|     combined_service_type | 4 | uimsbf |
|     enhancement_type | 4 | uimsbf |
|     reserved | 3 | '111' |
|     enhancement_right_flag | 1 | bslbf |
|     sync_type | 4 | uimsbf |
|     enhancement_stream_format | 8 | uimsbf |
|     enhancement_stream_sampling_factor | 8 | uimsbf |
|     if (sync_type!=0x0) { | | |
|         avail_time_start | 32 | uimsbf |
|     } | | |
|     if (enhancement_type==0x1 \|\| enhancement_type==0x2) { | | |
|         linked_TSID | 16 | uimsbf |
|         linked_program_number | 16 | uimsbf |
|     } | | |
|     else if (event_enhancement_type==0x3) { | | |
|         internet_linkage_information ( ) | | |
|     } | | |
|     if (enhancement_stream_format==0x25 \|\| | | |
|     enhancement_stream_format==0x26) { | | |
|         disparity_near | 16 | tcimsbf |
|         disparity_far | 16 | tcimsbf |
|     } | | |
| } | | |

FIG. 40

| Field | Description |
|---|---|
| 0x0 | Scalable video service (2D) |
| 0x1 | 3D stereoscopic service |
| 0x2 | 3D multiview service |
| 0x3 | UD video service |
| 0x4 ~ | Reserved |

(a)

| Field | Description |
|---|---|
| 0x0 | This event contains all necessary components of a service (enhancement data is also received in a state of being included as component of event) |
| 0x1 | enhancement data is received via another channel/path and the type of reception path is equal to this event (e.g., if event is received via terrestrial channel, enhancement data is also received via another terrestrial channel). detailed path information of enhancement data uses linked_TSID and linked_program_number. |
| 0x2 | event includes only enhancement data and essential data is transmitted via the path of same type. that is, both enhancement data and essential data are received via terrestrial channels. similarly, detailed path information of essential data uses linked_TSID and linked_program_number field. |
| 0x3 | enhancement data of this event is received via internet. path information for accessing enhancement data uses internet_linkage_information. |
| 0x4 ~ | Reserved |

(b)

| Field | Description |
|---|---|
| 0x0 | component of this event and enhancement data are simultaneously transmitted (synchronized transmission) |
| 0x1 | enhancement data is transmitted later than this event (for normal 3D viewing, this event is recorded and then combined/coupled with enhancement data received later.) |
| 0x2 | enhancement data is transmitted before event and, for normal 3D vidwing, event component received in real time and already received enhancement data is combined/coupled. |
| 0x3 | this is similar to 001 but synchronized transmission of enhancement data is also possible. |
| 0x4 | this is similar to 010 but synchronized transmission of enhancement data is also possible. |

| Field | Description |
|---|---|
| 0x02 | MPEG-2 video stream |
| 0x1B | AVC/H.264 video stream |
| 0x1F | SVC video sub-bitstream |
| 0x20 | MVC video sub-bitstream |
| 0x23 | additional video stream coded into MPEG-2 video |
| 0x24 | additional video stream coded into AVC/H.264 video |
| 0x25 | depth (disparity) map coded into MPEG-2 video |
| 0x26 | depth (disparity) map coded into AVC/H.264 video |
| Others | Unspecified or reserved |

(a)

| Field | Description |
|---|---|
| 0x0 | same resolution as base video |
| 0xXY | width is 1/(X+1) of base video and height is 1/(Y+1) of base video |

| Syntax | No. of bits | Format |
|---|---|---|
| program_enhancement_descriptor ( ) { | | |
|     descriptor_tag | 8 | 0xTBD |
|     descriptor_length | 8 | uimsbf |
|     combined_service_type | 4 | uimsbf |
|     enhancement_type | 4 | uimsbf |
|     reserved | 3 | '111' |
|     enhancement_right_flag | 1 | bslbf |
|     sync_type | 4 | uimsbf |
|     enhancement_stream_format | 8 | uimsbf |
|     enhancement_stream_sampling_factor | 8 | uimsbf |
|     if (enhancement_type==0x1 \|\| enhancement_type==0x2) { | | |
|         linked_TSID | 16 | uimsbf |
|         linked_program_number | 16 | uimsbf |
|         reserved | 3 | '1111' |
|         linked_elementary_PID | 13 | uimsbf |
|     } | | |
|     else if (enhancement_type==0x3) { | | |
|         internet_linkage_information ( ) | | |
|     } | | |
|     if (enhancement_stream_format==0x25 \|\| enhancement_stream_format==0x26) { | | |
|         disparity_near | 16 | tcimsbf |
|         disparity_far | 16 | tcimsbf |
|     } | | |
| } | | |

FIG. 43

| Syntax | No. of bits | Format |
|---|---|---|
| channel_enhancement_descriptor ( ) { | | |
|     descriptor_tag | 8 | 0xTBD |
|     descriptor_length | 8 | uimsbf |
|     combined_service_type | 4 | uimsbf |
|     enhancement_type | 4 | uimsbf |
|     reserved | 3 | '111' |
|     enhancement_right_flag | 1 | bslbf |
|     sync_type | 4 | uimsbf |
|     enhancement_stream_format | 8 | uimsbf |
|     enhancement_stream_sampling_factor | 8 | uimsbf |
|     if (enhancement_type==0x1 \|\| enhancement_type==0x2) { | | |
|         linked_TSID | 16 | uimsbf |
|         linked_program_number | 16 | uimsbf |
|         reserved | 4 | '1111' |
|         linked_major_channel_number | 10 | uimsbf |
|         linked_minor_channel_number | 10 | uimsbf |
|         linked_source_id | 16 | uimsbf |
|         reserved | 3 | '111' |
|         linked_elementary_PID | 13 | uimsbf |
|     } | | |
|     else if (enhancement_type==0x3) { | | |
|         internet_linkage_information ( ) | | |
|     } | | |
|     if (enhancement_stream_format==0x25 \|\| enhancement_stream_format==0x26) { | | |
|         disparity_near | 16 | tcimsbf |
|         disparity_far | 16 | tcimsbf |
|     } | | |
| } | | |

FIG. 44

| Syntax | No. of bits | Format |
|---|---|---|
| service_enhancement_descriptor ( ) { | | |
|     descriptor_tag | 8 | 0xTBD |
|     descriptor_length | 8 | uimsbf |
|     combined_service_type | 4 | uimsbf |
|     enhancement_type | 3 | uimsbf |
|     reserved | 3 | '111' |
|     enhancement_right_flag | 1 | bslbf |
|     sync_type | 4 | uimsbf |
|     enhancement_stream_format | 8 | uimsbf |
|     enhancement_stream_sampling_factor | 8 | uimsbf |
|     if(enhancement_type==0x1 \|\| enhancement_type==0x2) { | | |
|         linked_TSID | 16 | uimsbf |
|         linked_original_network_id | 16 | uimsbf |
|         linked_service_id | 16 | '1111' |
|     } | | |
|     else if(enhancement_type==0x3) { | | |
|         internet_linkage_information ( ) | | |
|     } | | |
|     if(enhancement_stream_format==0x25 \|\| enhancement_stream_format==0x26) { | | |
|         disparity_near | 16 | tcimsbf |
|         disparity_far | 16 | tcimsbf |
|     } | | |
| } | | |

FIG. 45

| Syntax | No. of bits | Format |
|---|---|---|
| event_enhancement_descriptor ( ) { | | |
|     descriptor_tag | 8 | 0xTBD |
|     descriptor_length | 8 | uimsbf |
|     combined_service_type | 4 | uimsbf |
|     enhancement_type | 4 | uimsbf |
|     reserved | 3 | '111' |
|     enhancement_right_flag | 1 | bslbf |
|     sync_type | 4 | uimsbf |
|     enhancement_stream_format | 8 | uimsbf |
|     enhancement_stream_sampling_factor | 8 | uimsbf |
|     if (sync_type!=0x0) { | | |
|         avail_time_start | 32 | uimsbf |
|     } | | |
|     if (enhancement_type==0x1 \|\| enhancement_type==0x2) { | | |
|         linked_event_id | 16 | uimsbf |
|         linked_TSID | 16 | uimsbf |
|         linked_original_network_id | 16 | uimsbf |
|         linked_service_id | 16 | uimsbf |
|     } | | |
|     else if (enhancement_type==0x3) { | | |
|         internet_linkage_information ( ) | | |
|     } | | |
|     if (enhancement_stream_format==0x25 \|\| enhancement_stream_format==0x26) { | | |
|         disparity_near | 16 | tcimsbf |
|         disparity_far | 16 | tcimsbf |
|     } | | |
| } | | |

FIG. 46

| stream_content | component_type | Description |
|---|---|---|
| 0x01 | 0x11 | MPEG-2 video, non-essential 3D video, 25Hz |
| 0x01 | 0x12 | MPEG-2 video, non-essential 3D video, 30Hz |
| 0x01 | 0x13 | MPEG-2 video, depth/disparity map data |
| 0x05 | 0x84 | H.264/AVC video, non-essential 3D video, 25Hz |
| 0x05 | 0x85 | H.264/AVC video, non-essential 3D video, 30Hz |
| 0x05 | 0x86 | H.264/AVC video, depth/disparity map data |
| 0x05 | 0x87 | Enhancement layer, (enhancement to frame-compatible 3D service), 25Hz |
| 0x05 | 0x88 | Enhancement layer, (enhancement to frame-compatible 3D service), 30Hz |
| 0x05 | 0x89 | MVC enhancement layer, (enhancement to service-compatible 3D service), 25Hz |
| 0x05 | 0x90 | MVC enhancement layer, (enhancement to service-compatible 3D service), 30Hz |

FIG. 47

| Syntax | No. of bits | Format |
|---|---|---|
| transport_packet () { | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     continuity_counter | 4 | uimsbf |
|     if (adaptation_field_control=='10' \| adaptation_field_control=='11') { | | |
|         adaptation_field () | | |
|     } | | |
|     if (adaptation_field_control=='01' \| adaptation_field_control=='11') { | | |
|         for ( i=0; i<N; i-- ) { | | |
|             data_byte | 8 | uimsbf |
|         } | | |
| } | | |

FIG. 48

| Syntax | No. of bits | Format |
|---|---|---|
| adaptation_field ( ) { | | |
|     adaptation_field_length | 8 | uimsbf |
|     if ( adaptation_field_length > 0 ) { | | |
|         discontinuity_indicator | 1 | bslbf |
|         random_access_indicator | 1 | bslbf |
|         elementary_stream_priority_indicator | 1 | bslbf |
|         PCR_flag | 1 | bslbf |
|         OPCR_flag | 1 | bslbf |
|         splicing_point_flag | 1 | bslbf |
|         transport_private_data_flag | 1 | bslbf |
|         adaptation_field_extension_flag | | |
|         if (PCR_flag=='1') { | | |
|             program_clock_reference_base | 33 | uimsbf |
|             Reserved | 6 | bslbf |
|             program_clock_reference_extension | 9 | uimsbf |
|         } | | |
|         if (OPCR_flag=='1') { | | |
|             original_program_clock_reference_base | 33 | uimsbf |
|             Reserved | 6 | bslbf |
|             original_program_clock_reference_extension | 9 | uimsbf |
|         } | | |
|         if (splicing_point_flag=='1') { | | |
|             splice_countdown | 8 | tcimsbf |
|         } | | |
|         if (transport_private_data_flag=='1') { | | |
|             transport_private_data_length | 8 | uimsbf |
|             for (i=0; i < transport_private_data_length; i++) { | | |
|                 private_data_byte | 8 | bslbf |
|             } | | |
|         } | | |
|         if (adaptation_field_extension_flag=='1') { | | |
|             adaptation_field_extension_length | 8 | uimsbf |
|             ltw_flag | 1 | bslbf |
|             piecewise_rate_flag | 1 | bslbf |
|             seamless_splice_flag | 1 | bslbf |
|             Reserved | 5 | bslbf |
|             if (ltw_flag=='1') { | | |
|                 ltw_valid_flag | 1 | bslbf |
|                 ltw_offset | 15 | uimsbf |
|             } | | |
|             if (piecewise_rate_flag=='1') { | | |
|                 reserved | 2 | bslbf |
|                 piecewise_rate | 22 | uimsbf |
|             } | | |
|             if (seamless_splice_flag=='1') { | | |
|                 splice_type | 4 | bslbf |
|                 DTS_next_AU[32..30] | 3 | bslbf |
|                 marker_bit | 1 | bslbf |
|                 DTS_next_AU[29..15] | 15 | bslbf |
|                 marker_bit | 1 | bslbf |
|                 DTS_next_AU[14..0] | 15 | bslbf |
|                 marker_bit | 1 | bslbf |
|             } | | |
|             for ( i = 0; i < N; i++) { | | |
|                 reserved | 8 | bslbf |
|             } | | |
|         } | | |
|         for (i = 0; i < N; i++) { | | |
|             stuffing_byte | 8 | bslbf |
|         } | | |
|     } | | |
| } | | |

FIG. 49

| Syntax | No. of bits | Format |
|---|---|---|
| video_frame_info_data_byte () { | | |
|     frame_info_type | 7 | uimsbf |
|     video_frame_info | 33 | uimsbf |
| } | | |

(a)

| frame_info_type | video_frame_info |
|---|---|
| 0x01 | Decoding order number |
| 0x02 | Display order number |
| 0x03 | PTS value (with clock frequency of 90 kHz) |
| 0x04 | Absolute display time - The MSB of this field being set to '0' the remaining bits denote 32-bit unsigned integer expressed as the number of GPS seconds since 00:00:00 UTC, January 6, 1980 |
| 0x05 | Modified PTS – this is a relative time stamp with the value of video_frame_info of the first picture of the video element being 0. The video_frame_info of each picture is relative count since the display time of the first picture of the video element. The count is in units of period of system clock frequency of 90kHz. |
| others | Reserved |

(b)

FIG. 52
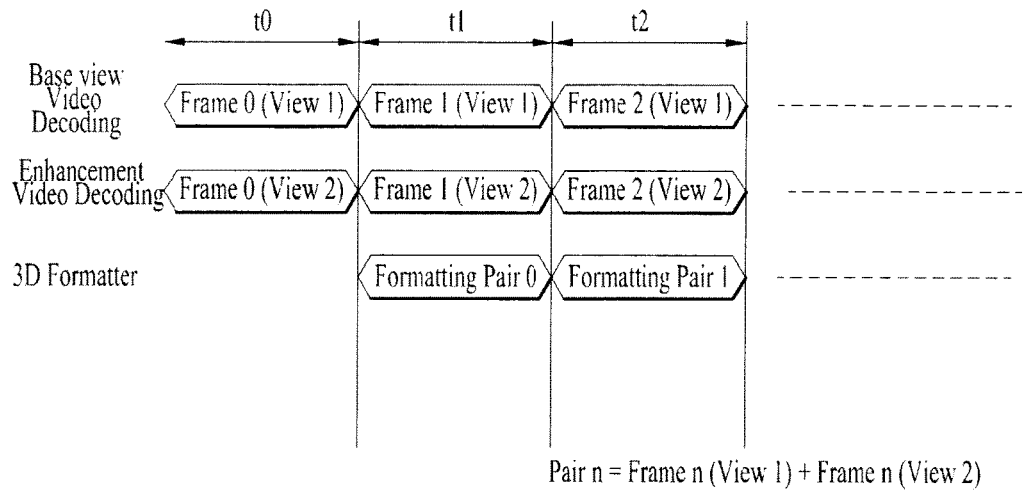
(a)
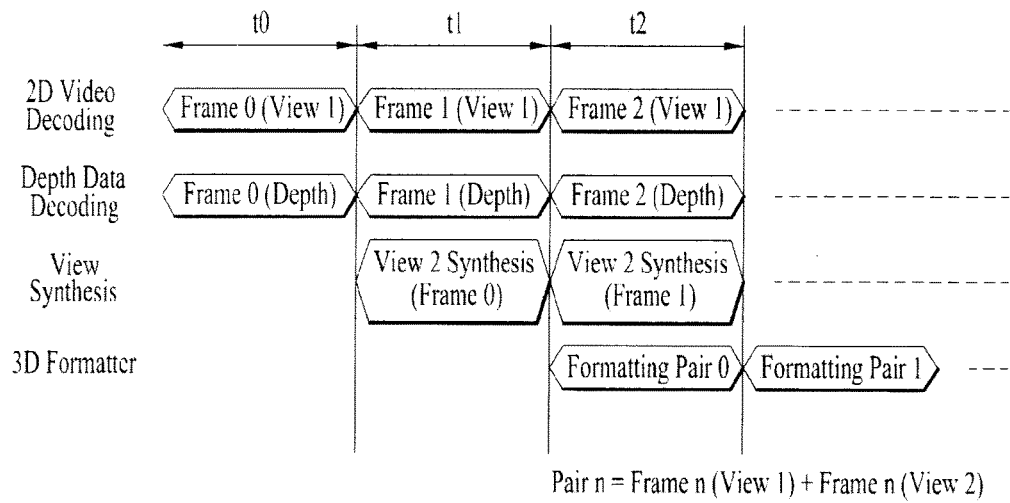
(b)

DEVICE AND METHOD FOR RECEIVING DIGITAL BROADCAST SIGNAL

This application is a 35 USC §371 National Stage entry of International Application No. PCT/KR2011/009458 filed Dec. 8, 2011, and claims priority of U.S. provisional Application No. 61/421,194 filed Dec. 8, 2010; 61/446,504 filed Feb. 25, 2011; 61/453,126 filed Mar. 15, 2011; 61/453,136 filed Mar. 16, 2011; 61/467,368 filed Mar. 24, 2011, which are hereby incorporated by reference in its entirety.

TECHNICAL FIELD

The present invention relates to a device and method for receiving a digital broadcast signal including a three-dimensional (3D) image and, more particularly, to a device and method for receiving a digital broadcast signal including a 3D image via a plurality of channels or a plurality of programs and displaying a 3D image.

BACKGROUND ART

As 3D televisions have come into widespread use, 3D image content has come into widespread use and transmission of 3D image content by a digital broadcast as well as by a storage medium has been activated.

In general, a 3D image provides a stereoscopic effect using the principle of stereo vision of two eyes. Since a human feels a perspective effect through binocular parallax due to an interval between the eyes spaced apart from each other by about 65 mm, a 3D image is provided such that a left eye and a right eye view respective plan images, thereby providing a stereoscopic effect and a perspective effect.

Examples of a 3D image display method include a stereoscopic method, a volumetric method, a holographic method, etc. In the stereoscopic method, a left view image to be viewed by a left eye and a right view image to be viewed by a right eye are provided and the left eye and the right eye respectively view the left view image and the right view image through polarized glasses or a display device, thereby perceiving a 3D image effect.

In case of 3D stereoscopic image content, when two similar images having different views are received, a reception device displays the two images as a 3D image. At this time, a method of sending the two similar images having different views via an existing broadcast channel or a method of respectively sending the two similar images having different views via an existing broadcast channel and a separate transport channel may be used. In this case, in order to enable a reception device to display the two images as a 3D image, signal information of the two images forming a pair must be received. If such information is not received, a left view image and a right view image forming one 3D image may not be distinguished so as not to restore the 3D image. In addition, it is difficult to know synchronization times of the left view image and the right view image and when a 3D image may be displayed.

DISCLOSURE

Technical Problem

An object of the present invention devised to solve the problem lies in a digital broadcast signal reception device and method which is capable of receiving a digital broadcast signal including signal information for displaying a 3D image without the above-described problems and displaying a 3D image.

Technical Solution

The object of the present invention can be achieved by providing a digital broadcast signal reception device for providing a three-dimensional (3D) stereoscopic image including a first reception unit for receiving a digital broadcast signal including a video stream of a base view and signaling data, a signaling data processor for decoding information about a video stream of an enhancement view included in the signaling data and coupled with the video stream of the base view to implement a 3D image, a second reception unit for receiving a digital broadcast signal including the video stream of the enhancement view using information about the video stream of the enhancement view, a base video decoder for decoding the received video stream of the base view and generating a base video, an enhancement video decoder for decoding the received video stream of the enhancement view and generating an enhancement video, and an output formatter for coupling the base video and the enhancement video and outputting a 3D stereoscopic image signal.

In the digital broadcast signal reception device according to the embodiment of the present invention, the second reception unit may include a tuner for receiving the video stream of the enhancement view via a radio broadcast channel or an Internet access unit for receiving the video stream of the enhancement view through Internet access, using the information about the video stream of the enhancement view.

In the digital broadcast signal reception device according to the embodiment of the present invention, the information about the video stream of the enhancement view may include a transport ID of the video stream of the enhancement view.

In the digital broadcast signal reception device according to the embodiment of the present invention, the information about the video stream of the enhancement view may include information about a time when the video stream of the enhancement view is received.

In another aspect of the present invention, provided herein is a digital broadcast signal reception device for providing a three-dimensional (3D) stereoscopic image including a first reception unit for receiving a digital broadcast signal including a video stream of a base view and signaling data, a base video decoder for decoding the received video stream of the base view and generating a base video, a second reception unit for receiving depth data of an enhancement view, a depth data decoder for decoding the received depth data, a synchronizer for synchronizing the base video and the decoded depth data, a rendering unit for rendering an enhancement video using the output of the synchronizer, and an output formatter for coupling the base video and the enhancement video and outputting a 3D stereoscopic image signal.

The digital broadcast signal reception device according to the embodiment of the present invention may further include a content and metadata memory for storing and providing the received depth data when necessary.

The digital broadcast signal reception device according to the embodiment of the present invention may receive a plurality of pieces of depth data in order to provide a 3D image having various depth ranges.

In another aspect of the present invention, provided herein is a digital broadcast signal reception method for providing a three-dimensional (3D) stereoscopic image including receiving a digital broadcast signal including a video stream of a base view and signaling data, decoding information about a video stream of an enhancement view included in the signaling data and coupled with the video stream of the base view to implement a 3D image, receiving a digital broadcast signal including the video stream of the enhancement view using information about the video stream of the enhancement view, decoding the received video stream of the base view and generating a base video, decoding the received video stream of the enhancement view and generating an enhancement video, and coupling the base video and the enhancement video and outputting a 3D stereoscopic image signal.

In the digital broadcast signal reception method according to the embodiment of the present invention, the receiving the digital broadcast signal including the video stream of the enhancement video may include receiving the video stream of the enhancement view via a radio broadcast channel or through Internet access, using the information about the video stream of the enhancement view.

In the digital broadcast signal reception method according to the embodiment of the present invention, the information about the video stream of the enhancement view may include a transport ID of the video stream of the enhancement view.

In the digital broadcast signal reception method according to the embodiment of the present invention, the information about the video stream of the enhancement view may include information about a time when the video stream of the enhancement view is received.

In another aspect of the present invention, provided herein is a digital broadcast signal reception method for providing a three-dimensional (3D) stereoscopic image including receiving a digital broadcast signal including a video stream of a base view and signaling data, decoding the received video stream of the base view and generating a base video, receiving depth data of an enhancement view, decoding the received depth data, synchronizing the base video and the decoded depth data, rendering an enhancement video using the output of a synchronizer, and coupling the base video and the enhancement video and outputting a 3D stereoscopic image signal.

The digital broadcast signal reception method according to the embodiment of the present invention may further include storing and providing the received depth data when necessary.

The digital broadcast signal reception method according to the embodiment of the present invention may receive a plurality of pieces of depth data in order to provide a 3D image having various depth ranges.

Advantageous Effects

The digital broadcast signal reception device and method according to the present invention has the following effects.

According to one embodiment of the present invention, it is possible to receive a digital broadcast signal and display a 3D image signal.

According to one embodiment of the present invention, it is possible to receive a digital broadcast signal and determine when a 3D image signal may be displayed.

According to one embodiment of the present invention, it is possible to receive a digital broadcast signal and obtain accurate synchronization information.

DESCRIPTION OF DRAWINGS

FIG. 2 is a diagram showing component_list_descriptor according to an embodiment of the present invention;

FIG. 3 is a diagram showing stream_info_details( ) according to an embodiment of the present invention;

FIG. 6 is a diagram showing stream_info_details( ) according to an embodiment of the present invention;

FIG. 8 is a diagram showing the syntax structure of a PMT including 3D_service_descriptor( ) according to an embodiment of the present invention;

FIG. 9 is a diagram showing the syntax of 3D_service_descriptor( ) included in a PMT according to an embodiment of the present invention;

FIG. 10 is a diagram showing program_combine_type according to an embodiment of the present invention;

FIG. 11 is a diagram showing the syntax of 3D_service_descriptor( ) included in a PMT according to an embodiment of the present invention;

FIG. 12 is a diagram showing event_sync_type according to an embodiment of the present invention;

FIG. 13 is a flowchart illustrating a method of providing 3D image signal information in a multi-path environment using a PMT according to an embodiment of the present invention;

FIG. 14 is a diagram showing the syntax structure of a TVCT including channel_combine_descriptor( ) according to an embodiment of the present invention;

FIG. 15 is a diagram showing the syntax of channel_combine_descriptor( ) included in a TVCT according to an embodiment of the present invention;

FIG. 16 is a diagram showing channel_combine_type according to an embodiment of the present invention;

FIG. 17 is a diagram showing the syntax of channel_combine_descriptor( ) according to an embodiment of the present invention;

FIG. 18 is a diagram showing channel_sync_type according to an embodiment of the present invention;

FIG. 20 is a diagram showing the syntax structure of an EIT including event_combine_descriptor( ) according to an embodiment of the present invention;

FIG. 21 is a diagram showing the syntax of event_combine_descriptor( ) according to an embodiment of the present invention;

FIG. 22 is a diagram showing event_combine_type according to an embodiment of the present invention;

FIG. 23 is a diagram showing the syntax of event_combine_descriptor( ) included in an EIT according to an embodiment of the present invention;

FIG. 24 is a diagram showing the syntax structure and audio type of stream_info_detail( ) of an audio stream according to an embodiment of the present invention;

FIG. 26 is a diagram showing the syntax structure of an SDT including service_combine_descriptor according to an embodiment of the present invention;

FIG. 27 is a diagram showing the syntax structure of service_combine_descriptor according to an embodiment of the present invention;

FIG. 28 is a diagram showing service_combine_type according to an embodiment of the present invention;

FIG. 29 is a diagram showing service_sync_type according to an embodiment of the present invention;

FIG. 31 is a diagram showing the syntax structure of an EIT of DVB-SI including event_combine_descriptor according to an embodiment of the present invention;

FIG. 32 is a diagram showing the syntax structure of event_combine_descriptor according to an embodiment of the present invention;

FIG. 33 is a diagram event_combine_type according to an embodiment of the present invention;

FIG. 34 is a diagram showing event_sync_type according to an embodiment of the present invention;

FIG. 36 is a diagram showing linkage_descriptor( ) and linkage_type according to an embodiment of the present invention;

FIG. 37 is a diagram showing a service type of a non-essential service according to an embodiment of the present invention;

FIG. 39 is a diagram showing the syntax of event_enhancement_descriptor( ) according to an embodiment of the present invention;

FIG. 40 is a diagram showing combined_service_type, enhancement_type and sync_type according to an embodiment of the present invention;

FIG. 41 is a diagram showing enhancement_stream_format and enhancement_stream_sampling_factor according to an embodiment of the present invention;

FIG. 42 is a diagram showing the syntax of program_enhancement_descriptor( ) according to an embodiment of the present invention;

FIG. 43 is a diagram showing the syntax of channel_enhancement_descriptor( ) according to an embodiment of the present invention;

FIG. 44 is a diagram showing the syntax of service_enhancement_descriptor( ) according to an embodiment of the present invention;

FIG. 45 is a diagram showing the syntax structure of event_enhancement_descriptor( ) according to an embodiment of the present invention;

FIG. 46 is a diagram showing stream_content and component_type according to an embodiment of the present invention;

FIG. 47 is a diagram showing transport_packet( ) according to an embodiment of the present invention;

FIG. 48 is a diagram showing adaptation_field( ) according to an embodiment of the present invention;

FIG. 49 is a diagram showing the syntax of video_frame_info_data_byte and video_frame_info according to an embodiment of the present invention;

FIG. 52 is a diagram showing a view synthesis and synchronization operation according to an embodiment of the present invention.

BEST MODE

Figure 1:
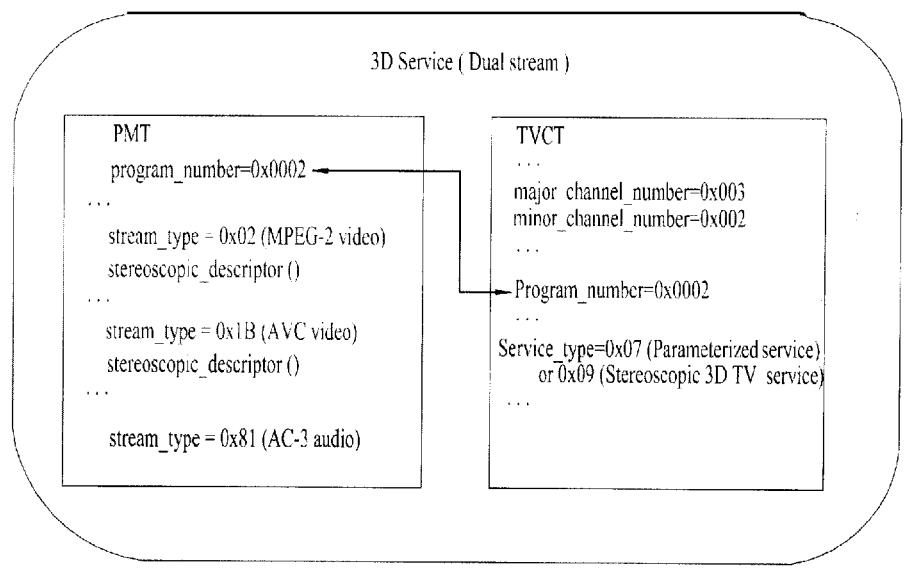
FIG. 1 is a diagram showing signal information of a channel for providing a 3D image service using dual streams in a single channel according to an embodiment of the present invention.

Hereinafter, the embodiments of the present invention will be described in detail with reference to the accompanying drawings although the present invention is not limited by the embodiments.

Although the terms used in the present invention are selected from generally known and used terms, terms used herein may be variable depending on operator's intention or customs in the art, appearance of a new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

A 3D image display method may include a stereoscopic method considering two views and a multiple view image method (a multi-view method) considering three or more views. A conventional single view image is referred to as a monoscopic image method.

The stereoscopic method uses a pair of images, that is, a left view image (hereinafter, referred to a left image) and a right view image (hereinafter, referred to a right image), acquired by capturing the same subject using a left camera and a right camera spaced apart from each other by a constant distance. Alternatively, a pair of a base video and an enhancement video may be used. Hereinafter, the left and right images and the base and enhancement videos are elements included in a 3D image of a stereoscopic method and may be used as the same meaning. The multi-view method uses three or more images acquired by capturing the same subject using three or more cameras having constant distances or angles. Hereinafter, although the stereoscopic method is described in one embodiment of the present invention, the present invention is applicable to a multi-view method.

The stereoscopic method according to the present invention includes a side-by-side mode, a top-bottom mode, a checker board mode, etc. In the side-by-side mode, a left image and a right image are ½ down-sampled in a horizontal direction, one sampled image is located in a left region and the other sampled image is located in a right region, thereby configuring one stereoscopic image. In the top-bottom mode, a left image and a right image are ½ down-sampled in a vertical direction, one sampled image is located in a top region and the other sampled image is located in a bottom region, thereby configuring one stereoscopic image. In the checker board mode, a left image and a right image are ½ down-sampled and block interlaced in vertical and horizontal directions such that two images are combined into one image. However, the stereoscopic method according to the present invention is not limited to the above examples. For example, in a method of providing a 3D image service through a plurality of channels described in the present invention, two images having original resolutions may be transmitted and received through the plurality of channels without down-sampling so as to provide a 3D image signal.

In the stereoscopic method, supplementary signal information for coupling left and right images or base and enhancement videos included in the same 3D image is necessary.

FIG. 1 is a diagram showing signal information of a channel for providing a 3D image service using dual streams in a single channel according to an embodiment of the present invention.

The 3D image service includes an MPEG-2 video stream, an advanced video coding (AVC) video stream and an AC-3 audio stream, all of which are respectively represented by stream_type 0x02 representing the MPEG-2 video stream, stream_type 0x1B representing the AVC video stream, and stream_type 0x81 representing the AC-3 audio stream in a program map table (PMT). In addition, the 3D image service clearly indicates a stereoscopic 3DTV service using a reserved value of service_type 0x07 (parameterized service) or 0x09 in a terrestrial virtual channel table (TVCT).

FIG. 2 is a diagram showing component_list_descriptor according to an embodiment of the present invention.

Detailed information regarding a video stream configuring a 3D stereoscopic service based on dual streams uses an extension of component_list_descriptor. This descriptor may signal a base video or an enhancement video. The location of this descriptor is a virtual channel level of a TVCT. Component_list_descriptor included in the TVCT includes information about a component stream included in a corresponding channel and content of signal information of the present invention is included in stream_info_details( ).

FIG. 3 is a diagram showing stream_info_details( ) according to an embodiment of the present invention. stream_info_details( ) includes stream_info_type, elementary_PID, SLD_element_index, base_video_flag, leftview_flag and/or upsampling_factor, which are information necessary for a 3D image service.

stream_info_type indicates the type of stream information, is set to 0x02 in case of a base video and is set to 0x03 in case of an enhancement video.

SLD_element_index means the order or index number of an elementary stream (ES) included in a service location descriptor (SLD) in a TVCT for an enhancement video channel. This region may map the ES of the SLD and component_list_descriptor information. Accordingly, it is possible to find a corresponding ES in the SLD of the TVCT for currently signaling an enhancement video channel.

The digital broadcast reception device of the present invention can find a stream matching component_list_descriptor information using at least one of elementary_PID and SLD_element_index included in stream_info_details( ).

base_video_flag indicates whether an encoded stream is a base video or an enhancement video. This field may be set to "1" if the video stream is a base video and may be set to "0" if the video stream is an enhancement video.

leftview_flag indicates whether an encoded stream is a left image or a right image. The video steam is a left image if the value of this field is "1" and is a right image if the value of this field is "0".

upsampling_factor provides information about resolution of an enhancement video stream and is defined as shown in FIG. 3. This field may be ignored in case of a base video (base_video_flag=="1"). If the value of upsampling_factor is 001, a base video and an enhancement video have the same resolution. The resolution of the enhancement video is ½ the resolution of the base video in a horizontal direction if the value of upsampling_factor is 010, is ½ the resolution of the base video in a vertical direction if the value of upsampling_factor is 011 and is ½ the resolution of the base video in vertical and horizontal directions if the value of upsampling_factor is 100.

The digital broadcast reception device according to the present invention may display a 3D image signal using an MPEG-2 video stream and an AVC video stream received through a single channel using the above-described component_list_descriptor and stream_info_details( ) included therein. A detailed process thereof will now be described.

Figure 4:
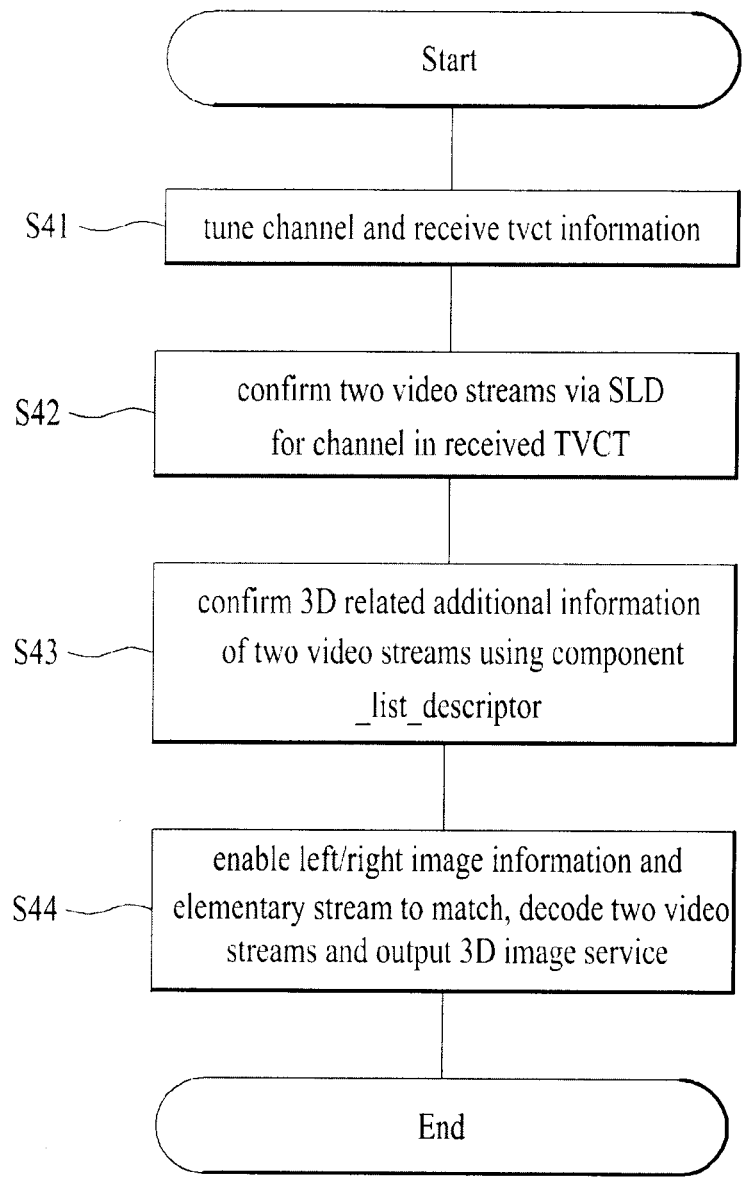
FIG. 4 is a flowchart illustrating a method of providing a 3D image service using a TVCT in a single channel and dual stream environment according to an embodiment of the present invention.

FIG. 4 is a flowchart illustrating a method of providing a 3D image service using a TVCT in a single channel and dual stream environment according to an embodiment of the present invention.

The digital broadcast reception device receives TVCT information of a selected 3D channel (service_type=0x07 or 0x09) after channel tuning (S41). Information about two video streams is confirmed using an SLD of a channel included in the received TVCT (S42). The information may be elementary_PID, etc. If information about the video streams is confirmed, 3D related additional information of the two video streams is confirmed using component_list_descriptor of the channel (S43). The additional information may include base_video_flag, leftview_flag, upsampling_factor, etc. In order to enable left/right image information confirmed using component_list_descriptor to match the elementary stream of the SLD, an elementary_PID or an SLD_element_index field is used. The matched two video streams are decoded to output a 3D image service (S44).

Figure 5:
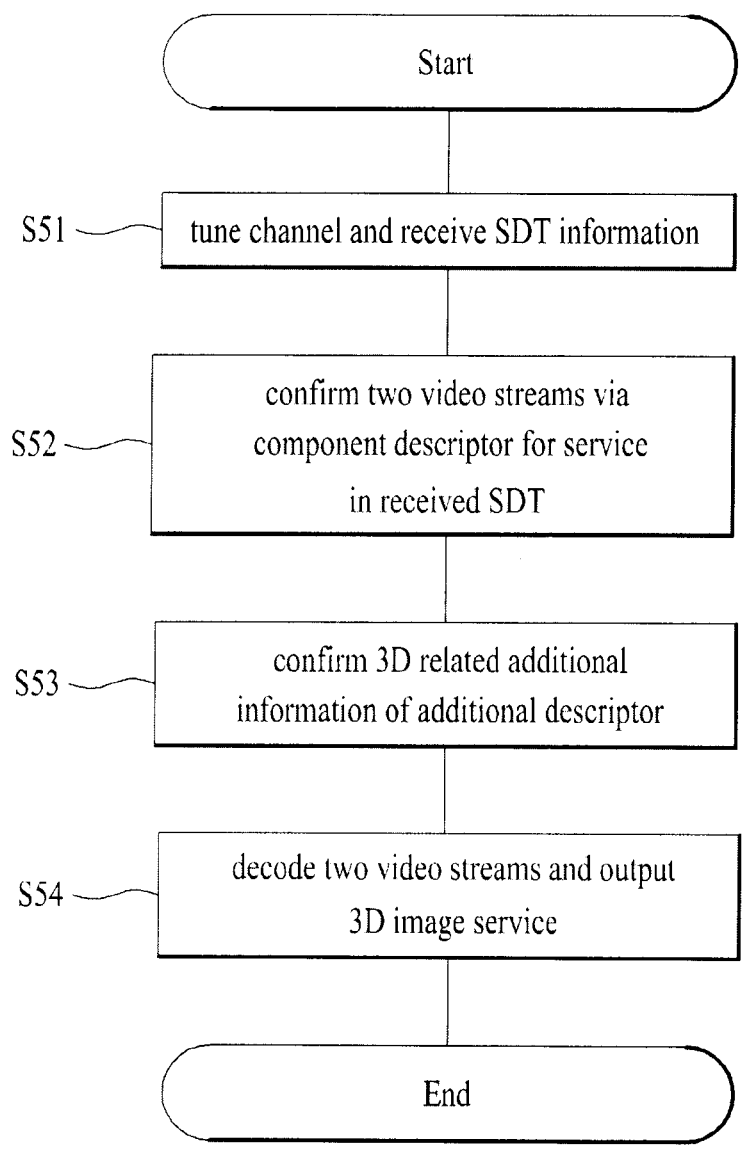
FIG. 5 is a flowchart illustrating a method of providing a 3D image service using an SDT in a single channel and dual stream environment according to an embodiment of the present invention.

FIG. 5 is a flowchart illustrating a method of providing a 3D image service using an SDT in a single channel and a dual stream environment according to an embodiment of the present invention.

The digital broadcast reception device receives SDT information of a selected 3D service (service_type=0x19 or 0x20) after channel tuning (S51). Information about two video streams is confirmed using a component descriptor of a service included in the received SLD (S52). The information may be stream_content, component_type, component_tag or elementary_PID. 3D related additional information of the two video streams is confirmed using an additional descriptor of the service (S53). The additional information may include base_video_flag, leftview_flag, upsampling_factor, etc. The matched two video streams are decoded to output a 3D image service (S54).

Next, the case of providing a frame-compatible 3D image service at a dedicated channel will be described. The channel for providing the 3D image service clearly indicates that service_type is a stereoscopic 3DTV service using a reserved value of 0x07 (parameterized service) or 0x09 in a signal information table of the channel. Detailed information regarding video streams configuring the frame-compatible 3D stereoscopic service uses an extension of component_list_descriptor. This descriptor includes signaling information of a combination of left and right images within video and a field included therein is equal to FIG. 2. The location of this descriptor is a virtual channel level of the TVCT.

Among fields included in component_list_descriptor, stream_type may use 0x1B or another value if a frame-compatible 3D image service is provided using H.264/AVC. Component_list_descriptor includes information about a component stream included in the channel and content of signal information of the present invention is included in stream_info_details( ).

FIG. 6 is a diagram showing stream_info_details( ) according to an embodiment of the present invention. stream_info_details( ) includes stream_info_type, elementary_PID, SLD_element_index and/or streo_video_format which are information necessary for a 3D image service.

stream_info_type means frame-compatible stereoscopic image and may be set to 0x05.

SLD_element_index means the order or index number of an elementary stream (ES) included in a service location descriptor (SLD) in a TVCT for an enhancement video channel. This region may map the ES of the SLD and component_list_descriptor information. Accordingly, it is possible to find a corresponding ES in the SLD of the TVCT indicating an enhancement video channel.

The digital broadcast reception device of the present invention can find a stream matching component_list_descriptor information using at least one of elementary_PID and SLD_element_index included in stream_info_details( ).

streo_video_format indicates a combination of a left image and a right image included in video and the meanings of the values thereof are shown in FIG. 6(b). A side-by-side mode is used if streo_video_format is 0000011, a top-and-bottom mode is used if streo_video_format is 0000100, and 2D video is used if streo_video_format is 0001000. The other values are not defined.

The digital broadcast reception device according to the present invention may display a 3D image signal using an MPEG-2 video stream and an AVC video stream received through a dedicated channel using the above-described component_list_descriptor and stream_info_details( ) included therein. A detailed process thereof will now be described.

The digital broadcast reception device receives TVCT information of a selected 3D channel (service_type=0x07 or 0x09) after channel tuning. Information about two video streams is confirmed using an SLD of a channel included in the received TVCT. The information may be elementary_PID. If information about the video streams is confirmed, 3D related additional information of the two video streams is confirmed using component_list_descriptor of the channel. The additional information may include stereo_video_format, etc. In order to enable left/right image information confirmed using component_list_descriptor to match the elementary stream of the SLD, an elementary_PID or an SLD_element_index field is used. The matched two video streams are decoded to output a 3D image service.

Next, the case in which a base video and an enhancement video included in a 3D image signal are received through a plurality of channels will be described. Since a single physical channel or medium has a restricted bandwidth, it is impossible to simultaneously transmit the base video and the enhancement video. In this case, a device and method for providing a 3D image service using a base video and an enhancement video received through a plurality of physical channels or media will be described. At this time, the plurality of physical media may be a terrestrial or Internet network.

Figure 7:
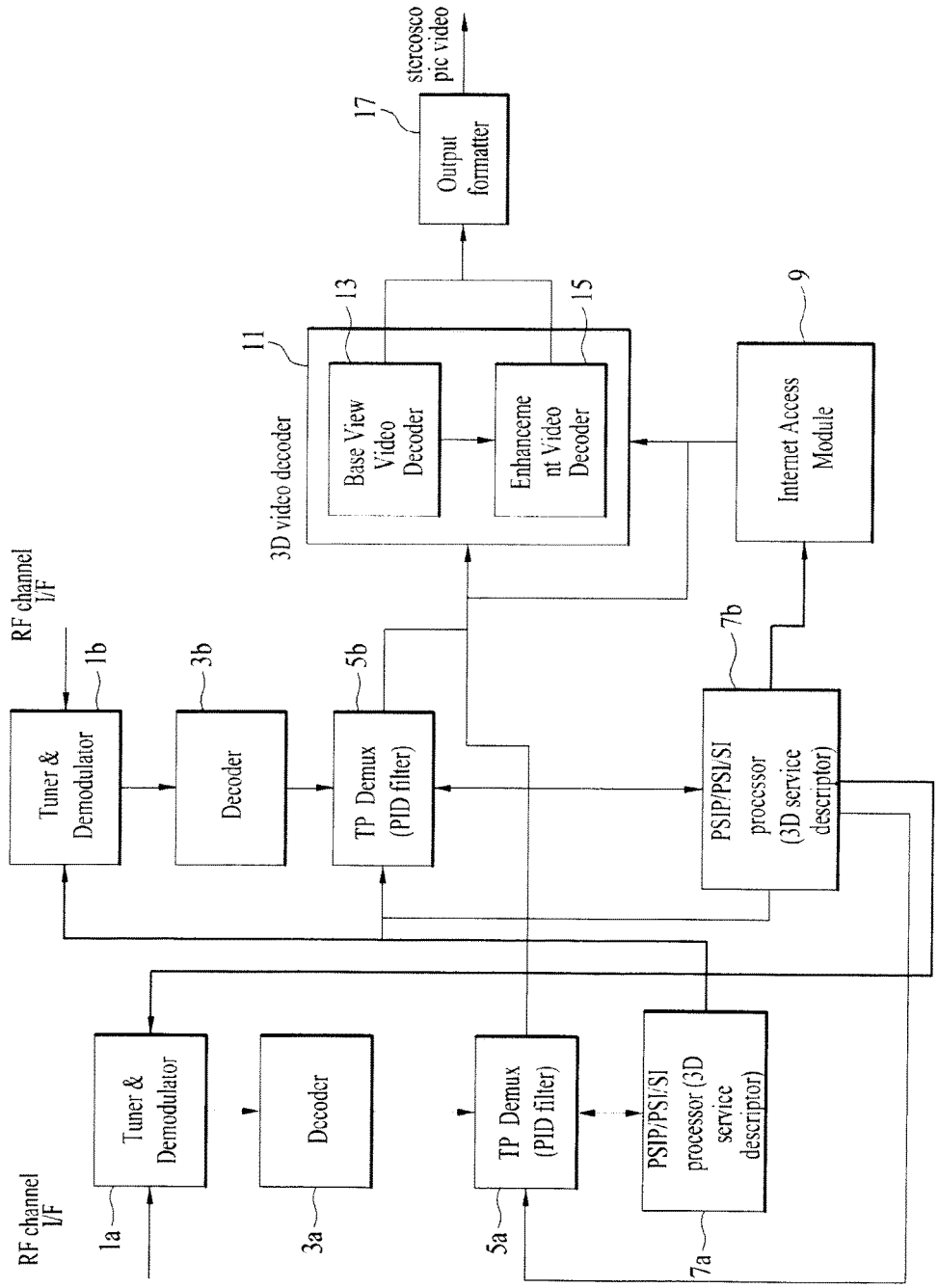
FIG. 7 is a diagram showing a digital broadcast reception device for receiving and displaying a 3D image using a plurality of channels according to an embodiment of the present invention.

FIG. 7 is a diagram showing a digital broadcast reception device for receiving and displaying a 3D image using a plurality of channels according to an embodiment of the present invention. The digital broadcast reception device according to the present invention may include a plurality of tuners and demodulators 1a and 1b, a plurality of decoders 3a and 3b, a plurality of demultiplexers 5a and 5b, a plurality of PSIP/PSI/SI processors 7a and 7b, an internet access unit 9, a 3D image decoder 11 and/or an output formatter 17. In addition, the 3D image decoder 11 may include a base view video decoder 13 and an enhancement video decoder 15.

Alternatively, the digital broadcast reception device may include one tuner and demodulator 1b, one decoder 3b, one demultiplexer 5b, one PSIP/PSI/SI processor 7b, an internet access unit 9, a 3D image decoder 11 and/or an output formatter 17. In addition, the 3D image decoder 11 may include a base view video decoder 13 and an enhancement video decoder 15.

The digital broadcast signals of the base video and the enhancement video received by the plurality of tuners and demodulators 1a and 1b are respectively demodulated and input to the decoders 3a and 3b. The input broadcast signals are respectively decoded by the plurality of decoders 3a and 3b and the decoded signals are respectively demultiplexed by the demultiplexers 5a and 5b. As a result, the signal information of the base video and the enhancement video are respectively input to the PSIP/PSI/SI processors 7a and 7b and the video streams of the base video and the enhancement video are respectively input to the base view video decoder 13 and the enhancement video decoder 15. The base video and the enhancement video may be displayed as one 3D image by the output formatter 17. The signal information of the base video and the enhancement video obtained by the PSIP/PSI/SI processors 7a and 7b may include information for coupling the base video and the enhancement video or the left image and the right image included in one 3D image. A plurality of tuners may receive a base video and an enhancement video included in one 3D image to form a pair. Such signal information may be received within a signal information table in the form of a descriptor. The signal information table may include a program map table (PMT), a terrestrial virtual channel table (TVCT), an event information table (EIT) or a service description table (SDT). Hereinafter, signal information transmitted by each table will be described in detail.

FIG. 8 is a diagram showing the syntax structure of a PMT including 3D_service_descriptor( ) according to an embodiment of the present invention.

The PMT provides mapping between program numbers and program elements. In order to signal a 3D image service, 3D_service_descriptor( ) may be transmitted within the PMT. At this time, 3D_service_descriptor( ) may be included in a first or second descriptor loop of the PMT.

The PMT includes the following fields.

A table_id field has 8 bits and TS_program_map_section is always set to a value of 0x02.

A section_syntax_indicator field has 1 bit and is set to 1.

A section_length field has 12 bits and the first two bits are 00. This field indicates the number of bytes of a section and indicates the length from this field to CRC. The value of this field does not exceed 1021.

A program_number field has 16 bits. This indicates to which program program_map_PID is applicable. Definition of one program is transmitted by only TS_program_map_section. This means that definition of the program does not exceed 1016.

A version_number field indicates the version of a virtual channel. The value of this field is incremented by one whenever a VCT is changed. If the version value reaches 31, a next version value becomes 0. The value of this field is necessarily equal to the value of the same field of an MGT.

A current_next_indicator field has 1 bit and the value thereof is set to 1 if a VCT is currently applicable. If the value thereof is set to 0, this means that the VCT is not applicable yet and a next table is valid.

The value of a section_number field is set to 0x00.

The value of a last_section_number field is set to 0x00.

A PCR_PID field has 13 bits and means a PID of a TS including a valid PCR field with respect to a program described by a program number.

A program_info_length field has 12 bits and the first two bits thereof have a value of 00. The remaining 10 bits indicate a descriptor following this field in bytes.

A stream_type field has 8 bits and indicates the type of a program element transmitted by packets having a PID value of a base PID.

An elementary_PID field has 13 bits and indicates a PID of a TS including a related program element.

An ES_info_length field has 12 bits and the first two bits are 00. The remaining 10 bits indicates a descriptor of a related program element following this field in bytes.

A CRC_32 field indicates a CRC value for zero output of a register in a decoder.

The present invention may be used when signal information is consistently maintained with respect to a 3D image service, by transmitting and receiving a PMT including 3D_service_descriptor( ). That is, if the same signal information which does not varies with time is transmitted and received with respect to a 3D image service, since the signal information may be maintained without updating the same service. Data transmission efficiency is excellent.

FIG. 9 is a diagram showing the syntax of 3D_service_descriptor( ) included in a PMT according to an embodiment of the present invention. The syntax of 3D_service_descriptor( ) may include descriptor_tag, descriptor_length, program_combine_type, linked_TSID, linked_program_number and/or internet_linkage_information( ).

Hereinafter, this information will be described.

descriptor_tag has a size of 8 bits, serves as an ID of the descriptor and is allocated a value of 0xTBD.

descriptor_length has a size of 8 bits and includes information about the number of bytes included in the descriptor.

program_combine_type has a size of 3 bits and indicates a combine type of a program signaled by a PMT section. FIG. 10 is a diagram showing program_combine_type according to an embodiment of the present invention. If program_combine_type is 000, this means that the program includes all components necessary for a 3D image service. For example, the program may include all of a base video, an enhancement video, a left image and a right image.

If program_combine_type is 001, this means that the program includes a part of components for the 3D image service and the part includes an essential element. The remaining components for serving a complete 3D image are received by a medium of the same type as the program and the remaining components may be obtained using linked_TSID and linked_program_number included in 3D_service_descriptor( ). In the worst case, for example, if the remaining components cannot be received, only the part of the 3D image service may be rendered. In this case, it is possible to provide a 2D video service using a base video.

If program_combine_type is 010, this means that the program includes a part of components for the 3D image service and the part does not include an essential element. The program may not provide any meaningful presentation to a user. The program must be combined with the essential element included in another program identified by linked_TSID and linked_program_number of 3D_service_descriptor( ) in order to provide a 3D image service. The essential element is received by a medium of the same type as the program.

If program_combine_type is 011, this means that the program includes a part of components for the 3D image service and the part includes an essential element. The remaining components for serving a complete 3D image are received via the Internet and a URL indicating the locations of the remaining components may be obtained via internet_linkage_information included in 3D_service_descriptor( ). In the worst case, for example, if the remaining components cannot be received, only the part of the 3D image service may be rendered. In this case, it is possible to provide a 2D video service using a base video.

If program_combine_type is 100, this means that the program includes a part of components for the 3D image service and the part does not include an essential element. The program may not provide any meaningful presentation to a user. The essential element is received via the Internet and the program must be combined with the essential element in order to provide a 3D image service. Access information of the essential element may be obtained through internet_linkage_information of 3D_service_descriptor( ).

linked_TSD has 16 bits and indicates transport_stream_ID of a transport stream if the transport stream for providing a 3D image service associated with the program is present.

linked_program_number has 16 bits and indicates program_number of a program including a separate transport stream for providing a 3D image service.

internet_linkage_information may include an IP address, a field indicating that the IP address has 32 bits or 128 bits, a port number and supplementary information (e.g., a URL of the stream).

An embodiment of a digital broadcast reception method using the above-described PMT will now be described.

If program 1 including a base view video element and an audio element and program 2 including an enhancement view video element and an audio element are received via a terrestrial channel, a PMT for program 1 includes signaling information of the base view video element and the audio element. Program_combine_type in 3D_service_descriptor( ) included in a first or second descriptor loop of the PMT for program 1 is set to 001 and linked_TSID indicates transport_stream_id of a transport stream including a PMT for program 2. In addition, linked_program_number indicates program_number of program 2.

The PMT for program 2 includes signaling information of the enhancement view video element. Program_combine_type in 3D_service_descriptor( ) included in a first or second descriptor loop of the PMT for program 2 is set to 010 and linked_TSID indicates transport_stream_id of a transport stream including the PMT for program 2.

Next, the case in which a program 1 including a base view video element and an audio element is received via a terrestrial channel and an enhancement view video element is received via the Internet will be described. The PMT for program 1 includes signaling information of the base view video element and the audio element. Program_combine_type in 3D_service_descriptor( ) included in a first or second descriptor loop of the PMT for program 1 is set to 011 and internet_linkage_information( ) provides access information of the enhancement view video element.

The digital broadcast reception device of the present invention may receive and combine a base video and an enhancement video of a 3D image service using signal information included in the above-described 3D_service_descriptor( ) and display a 3D image.

FIG. 11 is a diagram showing the syntax of 3D_service_descriptor( ) included in a PMT according to an embodiment of the present invention. The syntax of 3D_service_descriptor( ) may include descriptor_tag, descriptor_length, program_combine_type, event_sync_type, linked_TSID, linked_program_number and/or internet_linkage_information( ).

The description of the fields is equal to the description of FIG. 9 and only newly added event_sync_type will be described.

An event_sync_type field has a size of 3 bits and includes information indicating how the components of the 3D image service are obtained and synchronized. A detailed description thereof is equal to that of FIG. 12.

If event_sync_type is 000, the 3D image service may be provided only via synchronous 3D delivery.

If event_sync_type is 001, the 3D image service may be provided only via asynchronous 3D delivery. The remaining part for providing the 3D image service is transmitted afterward. In order to receive the remaining part, the reception device may use link information such as linked_TSID and linked_program_number.

If event_sync_type is 010, the 3D image service may be provided only via asynchronous 3D delivery. The remaining part for providing the 3D image service is transmitted previously. In order to receive the remaining part, the reception device may use link information such as linked_TSID and linked_program_number.

If event_sync_type is 011, the 3D image service may be provided via synchronous 3D delivery or asynchronous 3D delivery. The remaining part for providing the 3D image service is transmitted simultaneously with the current event or afterward. In order to receive the remaining part, the reception device may use link information such as linked_TSID and linked_program_number.

If event_sync_type is 100, the 3D image service may be provided via synchronous 3D delivery or asynchronous 3D delivery. The remaining part for providing the 3D image service is transmitted simultaneously with the current event or previously. In order to receive the remaining part, the reception device may use link information such as linked_TSID and linked_program_number.

FIG. 13 is a flowchart illustrating a method of providing 3D image signal information in a multi-path environment using a PMT according to an embodiment of the present invention.

The digital broadcast reception device receives PMT information of a selected program A after channel tuning (S131). Whether the program includes all elements (program_combine_type==0) using program_combine_type information of 3D_service_descriptor included in the PMT including information about program A is determined. If so not, a determination as to whether the program is an essential element or an enhancement element is made (S132). In addition, a determination as to whether a path for receiving another complementary component is the same terrestrial channel or the Internet is made using a program_combine_type field (S133). Subsequently, a component (elementary stream) corresponding to program A is received. A time when a coupled program is available is confirmed using the event_sync_type field. Therefore, it is possible to determine whether simultaneously reception is currently possible or reception is performed later.

The PMT corresponding to linked_TSID and linked_program_number confirmed via 3D_service_descriptor is received (S134). At this time, a process of further tuning to another channel may be generated according to circumstances.

If an enhancement stream needs to be received, information about a program B is received via the PMT in the previous step and a component (elementary stream) corresponding to program B is received (S135).

Both the elementary streams included in program A and program B may be decoded to display a complete 3D image service (S136). Alternatively, only a necessary part may be selectively decoded.

If program B is not currently available but may be available later, program A is received and stored (recorded) and the stream of the stored program A is played back when program B is received and is combined with program B, thereby providing a 3D image.

FIG. 14 is a diagram showing the syntax structure of a TVCT including channel_combine_descriptor( ) according to an embodiment of the present invention.

The TVCT includes attributes of virtual channels included in a transport stream in a PSIP of ATSC. In order to signal a 3D image service, 3D_service_descriptor( ) may be transmitted within the TVCT. At this time, 3D_service_descriptor( ) may be included in a first descriptor loop of the TVCT. 3D_service_descriptor( ) included in the TVCT provides 2D display window region information of a currently broadcast stream.

The fields included in the TVCT will now be described.

The value of a table_id field indicates the type of this table section. In order to indicate the TVCT, the value thereof is 0xC8.

A section_syntax_indicator field has a size of 1 bit and the value thereof is fixed to 1.

A private_indicator field is set to 1.

A section_length field has a size of 12 bits and the first two bits are 00. This field indicates the number of bytes of the section and indicates the length from this field to CRC. The value of this field does not exceed 1021.

A transport_stream_id field has a size of 16 bits and indicates an MPEG-2 transport stream ID. This field enables this TVCT to be distinguished from another TVCT.

A version_number field indicates the version of a virtual channel. The value of this field is incremented by one whenever a VCT is changed. Once the version value reaches 31, the next version value is set to 0. The value of this field is necessarily equal to the value of the same field of an MGT.

A current_next_indicator field has 1 bit and the value thereof is set to 1 if a VCT is currently applicable. If the value thereof is set to 0, this means that the VCT is not applicable yet and a next table is valid.

A section_number field indicates the number of sections. The value of a first section of the TVCT is 0x00 and the value of the section is incremented by one whenever the section is added.

A last_section_number field indicates the number of a last section, that is, the number of a section having a highest section_number in the TVCT.

A protocol_version field serves to allow a table of a type different from that defined in the current protocol to be added in the future. In the current protocol, only 0 is a valid value. A value other than 0 may be used for another table version in the future.

A num_channels_in_section field indicates the number of virtual channels in the VCT section. The value thereof is restricted by the section length.

A short_name field indicates the name of the virtual channel.

A major_channel_number field has 10 bits and indicates a major channel number of a virtual channel defined in a for-loop. Each virtual channel includes a major channel number and a minor channel number. The major channel number is used as a number referred to by a user along with a minor channel number with respect to the virtual channel. The major channel number has values of 1 to 99 and the major/minor channel number pairs do not have overlapping values in the TVCT.

A minor_channel_number field has 10 bits and has values of 0 to 999. The minor channel number is used as a two-part channel number along with the major channel number. If a service type is ATSC_digital_television or ATSC_audio_only, the minor channel number has values of 1 to 99. The major/minor channel number pairs do not have overlapping values in the TVCT.

A modulation_mode field indicates a modulation mode of a transport carrier associated with the virtual channel.

The value of a carrier_frequency field is 0. The carrier frequency is allowed to be confirmed using this field.

A channel_TSID field has values of 0x0000 to 0xFFFF and indicates an MPEG-2 TSID associated with a TS for delivering an MPEG-2 program referred over this virtual channel.

A program_number field associates with the virtual channel defined in the TVCT with an MPEG-2 PROGRAM ASSOCIATION and TS PROGRAM MAP table.

An ETM_location field indicates presence and location of an extended text message (ETM).

An access_controlled field is a 1-bit Boolean flag, indicates that an event associated with the virtual channel is accessed and controlled if the value thereof is 1, and indicates that access is not restricted if the value thereof is 0.

A hidden field is a 1-bit Boolean flag and access is not allowed even when a user directly inputs a number if the value thereof is 1. The hidden virtual channel is skipped when a user performs channel surfing and is hidden.

A hide_guide field is a Boolean flag and a virtual channel and an event may be displayed on an EPG display if a hidden channel is set to 0. If a hidden bit is not set, this field is ignored. Accordingly, a non-hidden channel and an event thereof belong to the EPG display regardless of the state of the hide_guide bit.

A service_type field checks the type of a service delivered by the virtual channel.

A source_id field confirms a programming source associated with the virtual channel. The source may be any one of video, text, data or audio programming. Source ID 0 is reserved and 0x0001 to 0x0fff have unique values within a TS for delivering a VCT. In addition, 0x1000 to 0xFFF have unique values at a regional level.

A descriptor_length field indicates the length of a following descriptor for the virtual channel in bytes.

No descriptor may be included in descriptor( ) or one or more descriptors may be included in descriptor( ).

An additional_descriptors_length field indicates the total length of a following VCT descriptor list in bytes.

A CRC_32 field indicates a CRC value for zero output of a register in a decoder.

In the present invention, it is possible to provide information about a base video or an enhancement video necessary for providing a 3D image service by transmitting channel_combine_descriptor( ) within the TVCT. That is, it is possible to provide information about a channel forming a pair with a current channel to provide a 3D image service and combine the two channels based on the information so as to provide a 3D image service to a user.

FIG. 15 is a diagram showing the syntax of channel_combine_descriptor( ) included in a TVCT according to an embodiment of the present invention.

channel_combine_descriptor( ) may include descriptor_tag, descriptor_length, channel_combine_type, associated_channel_TSID, associated_channel_program_number, associated_major_channel_number, associated_minor_channel_number, associated_source_id, and/or internet_linkage_information( ).

Hereinafter, this information will be described.

descriptor_tag has a size of 8 bits, serves as an ID of the descriptor and may be allocated a value of 0xTBD.

descriptor_length has a size of 8 bits and includes information about the number of bytes included in the descriptor.

channel_combine_type has a size of 3 bits and indicates the type of a channel signaled by a TVCT section. FIG. 16 is a diagram showing channel_combine_type according to an embodiment of the present invention. If channel_combine_type is 000, this means that the channel includes all components necessary for a 3D image service. For example, the channel may include all of a base video, an enhancement video, a left image and a right image.

If channel_combine_type is 001, this means that the channel includes a part of components for the 3D image service and the part includes an essential element. The channel may be a base video channel. The remaining components for serving a complete 3D image are received by a medium of the same type as the channel and the remaining components may be obtained using associated_channel_TSID, associated_channel_program_number, associated_major_channel_number, associated_minor_channel_number and associated_source_id. In the worst case, for example, if the remaining components cannot be received, only the part of the 3D image service may be rendered. In this case, it is possible to provide a 2D video service using a base video.

If channel_combine_type is 010, this means that the channel includes a part of components for the 3D image service and the part does not include an essential element. The channel may be an enhancement video channel. The channel may not provide any meaningful presentation to a user. The channel must be combined with the essential element included in another channel identified by associated_channel_TSID, associated_channel_program_number, associated_major_channel_number, associated_minor_channel_number and associated_source_id in order to provide a 3D image service. The essential element is received by a medium of the same type as the channel.

If channel_combine_type is 011, this means that the channel includes a part of components for the 3D image service and the part includes an essential element. The remaining components for serving a complete 3D image are received via the Internet and a URL indicating the locations of the remaining components may be obtained via internet_linkage_information. In the worst case, for example, if the remaining components cannot be received, only the part of the 3D image service may be rendered. In this case, it is possible to provide a 2D video service using a base video.

If channel_combine_type is 100, this means that the channel includes a part of components for the 3D image service and the part does not include an essential element. The channel may not provide any meaningful presentation to a user. The essential element is received via the Internet and the channel must be combined with the essential element in order to provide a 3D image service. Access information of the essential element may be obtained through internet_linkage_information.

associated_channel_TSID has a size of 16 bits and indicates a transport_stream_id value of a transport stream to be combined with this program/channel in order to provide a 3D image service.

associated_channel_program_number has a size of 16 bits and indicates a program_number value of a program/channel including a transport stream to be combined with this program/channel in order to provide a 3D image service.

associated_major_channel_number has a size of 10 bits and indicates a major_channel_number value of a program/channel including a transport stream to be combined with this program/channel in order to provide a 3D image service.

associated_minor_channel_number has a size of 10 bits and indicates a minor_channel_number value of a program/channel including a transport stream to be combined with this program/channel in order to provide a 3D image service.

associated_source_id has a size of 16 bits and indicates a source_id value of a channel/program including a transport stream to be combined with this program/channel in order to provide a 3D image service.

internet_linkage_information may include an IP address, a field indicating that the IP address has 32 bits or 128 bits, a port number and supplementary information (e.g., a URL of the stream).

The digital broadcast reception device of the present invention may receive and combine a base video and an enhancement video of a 3D image service using signal information included in the above-described channel_combine_descriptor( ) to display a 3D image.

An embodiment of a digital broadcast reception method using the above-described TVCT will now be described.

If a channel 1 including a base view video element and an audio element and a channel 2 including an enhancement view video element and an audio element are received via a terrestrial channel, a TVCT for channel 1 includes signaling information of the base view video element and the audio element. channel_combine_type in channel_combine_descriptor included in a descriptor loop of the TVCT for channel 1 is set to 001 and associated_channel_TSID indicates transport_stream_id of a transport stream including an element of channel 2. In addition, associated_channel_program_number indicates program_number of channel 2.

In order to obtain information about a coupled channel (channel 2), associated_major_channel_number, associated_minor_channel_number and associated_source_id may be used.

If the reception device is in a 2D mode, only the element of channel 1 may be used. The TVCT and the PMT for channel 2 include signaling information of the enhancement view video element.

channel_combine_type included in channel_combine_descriptor of the TVCT for channel 2 is set to 010 and associated_channel_TSID indicates transport_stream_id of a transport stream including the element of channel 1. In addition, associated_channel_program_number indicates the program_number of channel 1.

In order to obtain information about a coupled channel (channel 1), associated_major_channel_number, associated_minor_channel_number and associated_source_id may be used.

The reception device combines the elements of channel 1 and channel 2 so as to provide a complete 3D stereoscopic image service.

Next, the case in which a channel 1 including a base view video element and an audio element is received via a terrestrial channel and an enhancement view video element is received via the Internet will be described. The TVCT for channel 1 includes signaling information of the base view video element and the audio element. channel_combine_type included in channel_combine_descriptor of the TVCT for channel 1 is set to 011 and internet_linkage_information( ) provides access information of the enhancement view video element.

The digital broadcast reception device of the present invention may combine the element of channel 1 and the elements accessed via the Internet so as to provide a complete 3D stereoscopic image service.

The digital broadcast receiver of the present invention may receive and combine a base video and an enhancement video of a 3D image service using signal information included in the above-described channel_combine_descriptor( ) and display a 3D image.

FIG. 17 is a diagram showing the syntax of channel_combine_descriptor( ) according to an embodiment of the present invention. The syntax of channel_combine_descriptor( ) may include descriptor_tag, descriptor_length, channel_combine_type, channel_sync_type, associated_channel_TSID, associated_channel_program_number, associated_major_channel_number, associated_minor_channel_number, associated_source_id, and/or internet_linkage_information( ).

The description of the fields is equal to the description of FIG. 15 and only newly added channel_sync_type will be described.

A channel_sync_type field has a size of 3 bits and includes information indicating how the components of the 3D image service are obtained and synchronized.

FIG. 18 is a diagram showing channel_sync_type according to an embodiment of the present invention.

If event_sync_type is 000, the 3D image service may be provided only via synchronous 3D delivery.

If event_sync_type is 001, the 3D image service may be provided only via asynchronous 3D delivery. The remaining part for providing the 3D image service is transmitted afterward. In order to receive the remaining part, the reception device may use link information such as associated_channel_TSID, associated_channel_program_number, associated_major_channel_number, associated_minor_channel_number, associated_source_id, and internet_linkage_information.

If event_sync_type is 010, the 3D image service may be provided only via asynchronous 3D delivery. The remaining part for providing the 3D image service is transmitted previously. In order to receive the remaining part, the reception device may use link information such as associated_channel_TSID, associated_channel_program_number, associated_major_channel_number, associated_minor_channel_number, associated_source_id, and internet_linkage_information.

If event_sync_type is 011, the 3D image service may be provided via synchronous 3D delivery or asynchronous 3D delivery. The remaining part for providing the 3D image service is transmitted simultaneously with the current event or afterward. In order to receive the remaining part, the reception device may use link information such as associated_channel_TSID, associated_channel_program_number, associated_major_channel_number, associated_minor_channel_number, associated_source_id, and internet_linkage_information.

If event_sync_type is 100, the 3D image service may be provided via synchronous 3D delivery or asynchronous 3D delivery. The remaining part for providing the 3D image service is transmitted simultaneously with the current event or previously. In order to receive the remaining part, the reception device may use link information such as associated_channel_TSID, associated_channel_program_number, associated_major_channel_number, associated_minor_channel_number, associated_source_id, and internet_linkage_information.

Figure 19:
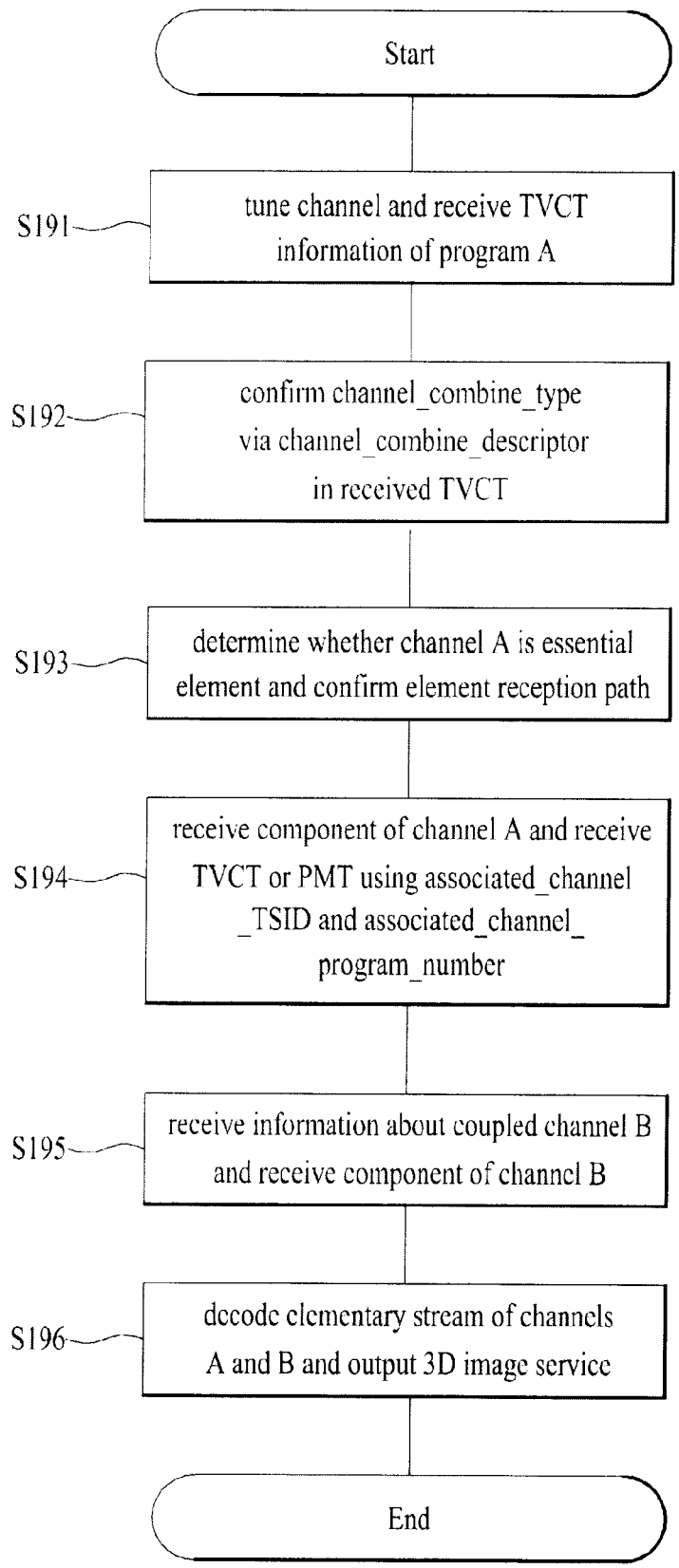
FIG. 19 is a flowchart illustrating a method of providing 3D image signal information in a multi-path environment using a TVCT according to an embodiment of the present invention.

FIG. 19 is a flowchart illustrating a method of providing 3D image signal information in a multi-path environment using a TVCT according to an embodiment of the present invention.

The digital broadcast reception device receives TVCT information of a selected channel A after channel tuning (S191). A determination as to whether the program includes all elements (channel_combine_type==0) using channel_combine_type information of channel_combine_descriptor is made. If so not, a determination as to whether the program is an essential element or an enhancement element is made (S192). In addition, a determination as to whether a path for receiving another complementary component is the same terrestrial channel or the Internet is made using a channel_combine_type field (S193). Subsequently, a component (elementary stream) corresponding to channel A is received. A time when a linked channel is available is confirmed using the channel_sync_type field. Therefore, it is possible to determine whether simultaneously reception is currently possible or reception is performed later.

The TVCT (or PMT) corresponding to associated_channel_TSID and associated_channel_program_number confirmed via channel_combine_descriptor is received (S194). At this time, a process of further tuning to another channel may be generated according to circumstances.

If an enhancement stream needs to be received, information about a channel B is received via the TVCT in the previous step and a component (elementary stream) corresponding to channel B is received (S195).

Both the elementary streams included in channel A and channel B may be decoded to display a complete 3D image service (S196). Alternatively, only a necessary part may be selectively decoded.

If channel B is not currently available but may be available later, channel A is received and stored (recorded) and the stream of the stored channel A is played back when program B is received and is combined with channel B, thereby providing a 3D image.

FIG. 20 is a diagram showing the syntax structure of an EIT including event_combine_descriptor( ) according to an embodiment of the present invention.

A table_id field has a size of 8 bits, is set to 0xCB and indicates that this section belongs to an EIT.

A section_syntax_indicator field has a size of 1 bit and the value thereof is set to 1. This means that the section follows generic section syntax after the section length field.

A private_indicator field has a size of 1 bit and is set to 1.

A section_length field has a size of 12 bits and indicates the number of bytes left to the end of the section including the CRC_32 field and indicates the length from this field to CRC. The value of this field does not exceed 4093.

A source_id field has a size of 16 bits and indicates source_id of a virtual channel for delivering an event described in this section.

A version_number field has a size of 5 bits and indicates the version number of EIT-i. The version number is incremented by one (modulo 32) if any field of EIT-I is changed. If i and j are different, the version number of EIT-I and the version number of EIT-j are unrelated. The value of this field is equal to the value of the same field of an MGT.

A current_next_indicator field has 1 bit and the value thereof is set to 1 with respect to an EIT section. The EIT is always applicable.

A section_number field has a size of 8 bits and indicates the number of this section.

A last_section_number has a size of 8 bits and indicates the number of a last section.

A protocol_version field has a size of 8 bits and serves to permit a table of a type different from that defined in the current protocol in the future. In the current protocol, only 0 is a valid value. A value other than 0 may be used for another table version in the future.

A num_events_in_section field has a size of 8 bits and indicates the number of events in this EIT section. If the value thereof is 0, this means that no event is defined in this section.

An event_id field has a size of 14 bits and indicates the ID of a described event. This is used as a part of ETM_id.

A start_time field has a size of 32 bits and indicates a start time of this event as the number of GPS seconds since 00:00:00 UTC, 6 Jan. 1980. Even in any virtual channel, the value of start_time may not be less than the value of end_time of a previous event. Here, end_time is defined as a value obtained by adding the length (length_in_seconds) of the event to start_time of the event.

An ETM_location field has a size of 2 bits and indicates presence and location of an extended text message (ETM).

A length_in_seconds field indicates the duration of this event in seconds.

A title_length field indicates the length of title_text( ) in bytes. The value of 0 indicates that the title of the event is not present.

Title_text( ) indicates the name of an event of a multiple string structure format.

A descriptors_length field indicates the total length of a following event descriptor in bytes. A descriptor of 0 or more is included in the EIT by a for-loop including descriptor( ). The type of the descriptor defined to be used in the EIT may include content_advisory_descriptor( ), the caption_service_descriptor( ), the AC-3 audio_stream_descriptor( ), etc. event_combine_descriptor( ) of the present invention may be included in descriptor( ).

A CRC_32 field has a size of 32 bits and indicates a CRC value for zero output of a register in a decoder.

The method of transmitting signal information for a 3D image service using the EIT includes a method of transmitting signal information including the above-described channel_combine_descriptor and a method of transmitting signal information including the below-described event_combine_descriptor.

The method of using channel_combine_descriptor may transmit channel_combine_descriptor in a state of being within the EIT of a channel via which a base video stream is transmitted. If channel_combine_descriptor is present in the EIT, an additional stream channel is present with respect to only a corresponding event. Accordingly, the additional stream channel is valid only during the broadcast period of the corresponding event. If associated channel information of the event is signaled using channel_combine_descriptor, an associated channel of the corresponding event is confirmed using associated_channel_TSID, associated_channel_program_number, associated_major_channel_number, associated_minor_channel_number, associated_source_id, etc.

The method of using event_combine_descriptor will now be described.

FIG. 21 is a diagram showing the syntax of event_combine_descriptor( ) according to an embodiment of the present invention.

event_combine_descriptor( ) may include descriptor_tag, descriptor_length, event_combine_type, linked_TSID, linked_program_number and/or internet_linkage_information( ).

Hereinafter, this information will be described.

descriptor_tag has a size of 8 bits, serves as an ID of the descriptor and may be allocated a value of 0xTBD.

descriptor_length has a size of 8 bits and includes information about the number of bytes included in the descriptor.

event_combine_type has a size of 3 bits and indicates the type of an event signaled by an EIT section. FIG. 22 is a diagram showing event_combine_type according to an embodiment of the present invent. If event_combine_type is 000, this means that the event includes all components necessary for a 3D image service. For example, channel may include all of a base video, an enhancement video, a left image and a right image.

If event_combine_type is 001, this means that the event includes a part of components for the 3D image service and the part includes an essential element. The remaining components for serving a complete 3D image are received by a medium of the same type as the event and the remaining components may be obtained using linked_TSID and linked_program_number. In the worst case, for example, if the remaining components cannot be received, only the part of the 3D image service may be rendered. In this case, it is possible to provide a 2D video service using a base video.

If event_combine_type is 010, this means that the event includes a part of components for the 3D image service and the part does not include an essential element. The event may not provide any meaningful presentation to a user. The event must be combined with the essential element included in another event identified by linked_TSID and linked_program_number in order to provide a 3D image service. The essential element is received by a medium of the same type as the event.

If event_combine_type is 011, this means that the event includes a part of components for the 3D image service and the part includes an essential element. The remaining components for serving a complete 3D image are received via the Internet and a URL indicating the locations of the remaining components may be obtained via internet_linkage_information. In the worst case, for example, if the remaining components cannot be received, only the part of the 3D image service may be rendered. In this case, it is possible to provide a 2D video service using a base video.

If event_combine_type is 100, this means that the event includes a part of components for the 3D image service and the part does not include an essential element. The event may not provide any meaningful presentation to a user. The essential element is received via the Internet and the event must be combined with the essential element in order to provide a 3D image service. Access information of the essential element may be obtained through internet_linkage_information.

linked_TSID has a size of 16 bits and indicates a transport_stream_ID value of a transport stream if the transport stream for providing a 3D image service associated with the program is present.

linked_program_number has a size of 16 bits and indicates program_number of a program including a transport stream for providing a 3D image service.

internet_linkage_information may include an IP address, a field indicating that the IP address has 32 bits or 128 bits, a port number and supplementary information (e.g., a URL of the stream).

An embodiment of a digital broadcast reception method using the above-described EIT will now be described.

If an event A including a base view video element and an audio element and an channel B including an enhancement view video element and an audio element are received via a terrestrial channel, an EIT for event A includes signaling information of the base view video element and the audio element. event_combine_type in event_combine_descriptor of the EIT for the event is set to 001 and linked_TSID indicates transport_stream_id of a transport stream including an element of channel B. In addition, linked_channel_program_number indicates program_number of channel B.

If channel_combine_descriptor( ) is used to obtain information about an associated channel (channel B), associated_major_channel_number, associated_minor_channel_number and associated_source_id may be used.

If the reception device is in a 2D mode, only the element of event A may be used. The TVCT and the PMT for channel B include signaling information of the enhancement view video element.

The reception device combines the elements of channel 1 and channel 2 so as to provide a complete 3D stereoscopic image service.

Next, the case in which an event A including a base view video element and an audio element is received via a terrestrial channel and an enhancement view video element is received via the Internet will be described. The EIT for event A includes signaling information of the base view video element and the audio element. channel_combine_type or event_combine_type included in channel_combine_descriptor or event_combine_descriptor of the EIT for event A is set to 011 and internet_linkage_information( ) provides access information of the enhancement view video element. The digital broadcast reception device of the present invention may combine the element of event A and the elements accessed via the Internet so as to provide a complete 3D stereoscopic image service.

FIG. 23 is a diagram showing the syntax of event_combine_descriptor( ) included in an EIT according to an embodiment of the present invention.

event_combine_descriptor( ) may include descriptor_tag, descriptor_length, event_combine_type, event_sync_type, avail_time_start, linked_TSID, linked_program_number and/or internet_linkage_information( ).

The description of the fields is equal to the description of FIG. 21 and newly added event_sync_type is equal to event_sync_type of the PMT described with reference to FIG. 12.

An avail_time_start field has a size of 32 bits and means a start time when a separate stream which may be combined with the stream of the current service to provide one 3D image service is transmitted. avail_time_start indicates a start time of this event as the number of GPS seconds since 00:00:00 UTC, 6 Jan. 1980. This field is meaningful only when the value of the event_sync_type field is "001" or "011".

The digital broadcast receiver of the present invention may receive and combine a base video and an enhancement video of a 3D image service using signal information included in the above-described event_combine_descriptor( ) so as to display a 3D image.

The essential element (base video) described in 3D_service_descriptor( ), channel_combine_descriptor( ) and event_combine_descriptor( ) respectively included in the PMT, the TVCT and the EIT are transmitted via a channel defined as an essential channel and this channel may provide a 2D video service alone. Service_type of this channel has a value of 0x02 for compatibility with the existing reception device.

In addition, a non-essential video (enhancement video) is transmitted via a non-essential channel and this channel may not provide any meaningful presentation to a user. Service_type of this channel has a value of 0x07 (parameterized service) or 0x0A (dependent service or non-standalone service).

In a 3D stereoscopic service based on dual streams of a base video and an enhancement video, detailed information regarding a stream transmitted via a non-essential channel uses an extension of component_list_descriptor as described with reference to FIG. 2. The location of component_list_descriptor is a virtual channel level of the TVCT.

Among components included in component_list_descriptor, in component_list_descriptor( ) of a video stream transmitted via a non-essential channel, stream_type is set to 0x1B or 0x24. This indicates H.264/AVC video. stream_info_detail( ) included in component_list_descriptor( ) has the same structure as the syntax structure of FIG. 3 and the description of the fields thereof is equal to that of FIG. 3.

Among components included in component_list_descriptor, in component_list_descriptor( ) of an audio stream transmitted via a non-essential channel, if audio is AC-3 audio, stream_type is set to 0x81. Other audio streams are set to stream_type values corresponding thereto.

FIG. 24(a) is a diagram showing the syntax structure of stream_info_detail( ) of an audio stream according to an embodiment of the present invention. stream_info_detail( ) of the audio stream includes stream_info_type, elementary_PID, SLD_element_index, audio_type and/or ISO_639_language_code.

A stream_info_type field has 8 bits and is set to 0x04, which means an enhancement audio stream for a 3D image service.

Audio_type indicates a method of using this stream if a separate audio stream transmitted via a non-essential channel is present. FIG. 24(b) is a diagram showing audio_type according to an embodiment of the present invention.

If audio_type is 001, an audio stream transmitted via a non-essential channel is used for a 3D image service and an audio stream transmitted via an essential channel is not used.

If audio_type is 010, an audio stream transmitted via an essential channel is used as a base stream and an audio stream transmitted via a non-essential channel is used as an enhancement stream. This is applicable to MPEG surround.

If audio_type is 011, an audio stream having another language is transmitted via a non-essential channel and language information refers to ISO_639_language_code appearing after an audio_type field.

As described above, the digital broadcast reception device according to the present invention may receive information of an enhancement video and enhancement audio via component_list_descriptor of video and audio streams transmitted via a non-essential channel and use the information to provide a 3D image service.

Figure 25:
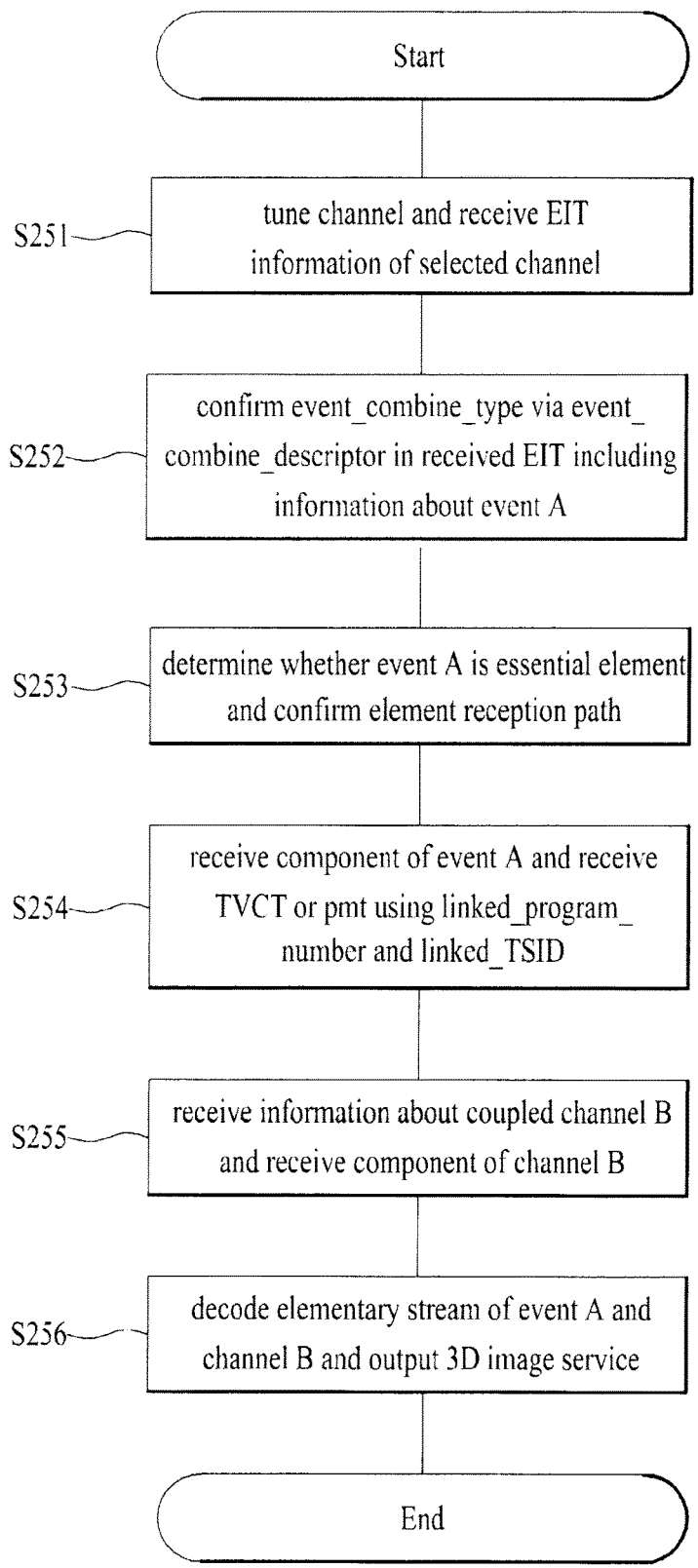
FIG. 25 is a flowchart illustrating a method of providing 3D image signal information in a multi-path environment using an EIT according to an embodiment of the present invention.

FIG. 25 is a flowchart illustrating a method of providing 3D image signal information in a multi-path environment using an EIT according to an embodiment of the present invention.

The digital broadcast reception device receives EIT information of a selected channel after channel tuning (S251). A determination as to whether the program includes all elements (event_combine_type==0) using event_combine_type information of event_combine_descriptor is made. If so not, a determination as to whether the program is an essential element or an enhancement element is made (S252). In addition, a determination as to whether a path for receiving another complementary component is the same terrestrial channel or the Internet is made using an event_combine_type field (S253). Subsequently, a component (elementary stream) corresponding to event A is received. A time when a linked channel is available is confirmed using the event_sync_type field. Therefore, it is possible to determine whether simultaneously reception is currently possible or reception is performed later.

The TVCT (or PMT) corresponding to linked_TSID and linked_program_number confirmed via event_combine_descriptor for event A is received (S254). At this time, a process of further tuning to another channel may be generated according to circumstances.

If an enhancement stream needs to be received, information about a channel B is received via the TVCT in the previous step and a component (elementary stream) corresponding to channel B is received (S255).

Both the elementary streams included in event A and channel B may be decoded to display a complete 3D image service (S256). Alternatively, only a necessary part may be selectively decoded.

If channel B is not currently available but may be available later, event A is received and stored (recorded) and the stream of the stored event A is played back when channel B is received and is combined with channel B, thereby providing a 3D image.

FIG. 26 is a diagram showing the syntax structure of an SDT including service_combine_descriptor according to an embodiment of the present invention.

The SDT describes services included in a specific transport stream in DVB-SI. In order to signal signaling information for providing a 3D image service, service_combine_descriptor( ) may be transmitted within the SDT. If a service A is a base video service and a service B is an enhancement video service, service_combine_descriptor including link information of the service B is located in a descriptor loop for the service A of the SDT section.

A table_id field has 8 bits and indicates that this section belongs to a service description table.

A section_syntax_indicator field has a size of 1 bit and is set to 1.

A section_length field has a size of 12 bits, the first two bits are set to 00, and this field indicates the number of bytes of a section including CRC after this field. This field does not exceed 1021 and the total length of this section is a maximum of 1024 bytes.

A transport_stream_id field has a size of 16 bits and serves as a label for distinguishing between TSs.

A version_number field has a size of 5 bits and indicates the version number of sub_table. The value of this field is incremented by one whenever sub_table is changed. If the version value reaches 31, a next version value is 0.

A current_next_indicator field has a size of 1 bit and the value thereof is set to 1 if sub_table is currently applicable. If the value of this field is set to 0, this means sub_table is not applied yet and a next table is valid.

A section_number field has a size of 8 bits and indicates the number of sections. A first section has a value of 0x00 and the value of this field is incremented by one whenever a section having the same table_id, the same transport_stream_id and the same original_network_id is added.

A last_section_number has a size of 8 bits and indicates the number of a last section (that is, highest section_number) of sub_table including this section.

An original_network_id field has a size of 16 bits and is a label for identifying network_id of a transmission system.

A service_id field has a size of 16 bits and serves as a label for distinguishing a service from another service included in a TS. This is equal to program_number of program_map_section.

An EIT_schedule_flag field has a size of 1 bit. If the value of this field is set to 1, this means that EIT schedule information for this service is currently included in the TS and, if the value of this field is set to 0, this means that EIT schedule information for this service is not included.

An EIT_present_following_flag field has a size of 1 bit. If the value of this field is set to 1, this means that EIT_present_following information for this service is currently included in the TS and, if the value of this field is set to 0, this means that EIT_present_following information is not currently included in the TS.

A running_status field has a size of 3 bits and indicates a service status.

A free_CA_mode field has a size of 1 bit. If the value of this field is set to 0, this means that all elementary streams of this service are not scrambled. If the value of this field is set to 1, this means that one or more streams are controlled by a CA stream.

A descriptors_loop_length has a size of 12 bits and indicates the total length of a following descriptor in bytes.

A CRC_32 field has a size of 32 bits and indicates a CRC value for zero output of a register in a decoder.

In the present invention, service_combine_descriptor of an enhancement video service which is a part of a 3D image service may be transmitted and received within an SDT and may be used when information about the 3D image service is consistently maintained. That is, if information about the 3D image service is not changed with time, since the same service may be maintained without updating signal information, data transmission efficiency is excellent.

FIG. 27 is a diagram showing the syntax structure of service_combine_descriptor according to an embodiment of the present invention.

The syntax of service_combine_descriptor( ) may include descriptor_tag, descriptor_length, service_combine_type, service_sync_type, associated_service_TSID, associated_service_original_network_id, associated_service_id, and/or internet_linkage_information( ).

Hereinafter, this information will be described.

descriptor_tag has a size of 8 bits, serves as an ID of the descriptor and may be allocated a value of 0xTBD.

descriptor_length has a size of 8 bits and includes information about the number of bytes included in the descriptor.

service_combine_type has a size of 3 bits and indicates the type of an event signaled by an SDT section. FIG. 28 is a diagram showing service_combine_type according to an embodiment of the present invention. If service_combine_type is 000, this means that the service includes all components necessary for a 3D image service. For example, channel may include all of a base video, an enhancement video, a left image and a right image.

If service_combine_type is 001, this means that the service includes a part of components for the 3D image service and the part includes an essential element. The remaining components for serving a complete 3D image are received by a medium of the same type as the service and the remaining components may be obtained using associated_service_TSID, associated_service_original_network_id and associated_service_id. In the worst case, for example, if the remaining components cannot be received, only the part of the 3D image service may be rendered. In this case, it is possible to provide a 2D video service using a base video.

If service_combine_type is 010, this means that the service includes a part of components for the 3D image service and the part does not include an essential element. The service may not provide any meaningful presentation to a user. The service must be combined with the essential element included in another service identified by associated_service_TSID, associated_service_original_network_id and associated_service_id in order to provide a 3D image service. The essential element is received by the same medium type as the service.

If service_combine_type is 011, this means that the service includes a part of components for the 3D image service and the part includes an essential element. The remaining components for serving a complete 3D image are received via the Internet and a URL indicating the locations of the remaining components may be obtained via internet_linkage_information. In the worst case, for example, if the remaining components cannot be received, only the part of the 3D image service may be rendered. In this case, it is possible to provide a 2D video service using a base video.

If service_combine_type is 100, this means that the service includes a part of components for the 3D image service and the part does not include an essential element. The service may not provide any meaningful presentation to a user. The essential element is received via the Internet and the service must be combined with the essential element in order to provide a 3D image service. Access information of the essential element may be obtained through internet_linkage_information.

A service_sync_type field has a size of 3 bits and includes information indicating how the components of the 3D image service are obtained and synchronized.

FIG. 29 is a diagram showing service_sync_type according to an embodiment of the present invention.

If service_sync_type is 000, the 3D image service may be only provided via synchronous 3D delivery.

If service_sync_type is 001, the 3D image service may be only provided via asynchronous 3D delivery. The remaining part for providing the 3D image service is transmitted afterward. In order to receive the remaining part, the reception device may use link information such as associated_service_TSID, associated_service_original_network_id, associated_service_id, or internet_linkage_information.

If service_sync_type is 010, the 3D image service may be provided only via asynchronous 3D delivery. The remaining part for providing the 3D image service is transmitted previously. In order to receive the remaining part, the reception device may use link information such as associated_service_TSID, associated_service_original_network_id, associated_service_id, or internet_linkage_information.

If service_sync_type is 011, the 3D image service may be provided via synchronous 3D delivery or asynchronous 3D delivery. The remaining part for providing the 3D image service is transmitted simultaneously with the current event or afterward. In order to receive the remaining part, the reception device may use link information such as associated_service_TSID, associated_service_original_network_id, associated_service_id, or internet_linkage_information.

If service_sync_type is 100, the 3D image service may be provided via synchronous 3D delivery or asynchronous 3D delivery. The remaining part for providing the 3D image service is transmitted simultaneously with the current event or previously. In order to receive the remaining part, the reception device may use link information such as associated_service_TSID, associated_service_original_network_id, associated_service_id, or internet_linkage_information.

associated_service_TSID has a size of 16 bits and indicates a transport_stream_id value of a transport stream to be combined with this program/service in order to provide a 3D image service.

associated_service_original_network_id has a size of 16 bits and indicates an original_network_id value of a service including a transport stream to be combined with this program/channel in order to provide a 3D image service.

associated_service_id has a size of 16 bits and indicates a service_id value of a service including a transport stream to be combined with this program/channel in order to provide a 3D image service.

In the present embodiments, since the values of the service_id field and the program_number field are the same, the linked_program_number field is omitted but the linked_program_number field may be included in service_combine_descriptor according to circumstances.

internet_linkage_information may include an IP address, a field indicating that the IP address has 32 bits or 128 bits, a port number, supplementary information (e.g., a URL of the stream) and available time slot (start time and end time) information.

Detailed information regarding a video stream included in a linked service may be confirmed by referring to the component descriptor of this service or by adding a component_tag value or an elementary_PID value of the component to the above-described service_combine_descriptor and checking that field. That is, according to embodiments, a component_tag or elementary_PID field of a video/audio stream associated with service_combine_descriptor may be included or stream related information such as stream_content and component_type may also be included.

The digital broadcast reception device of the present invention may receive and combine a base video and an enhancement video of a 3D image service using signal information included in the above-described service_combine_descriptor( ) to display a 3D image.

An embodiment of a digital broadcast reception method using the above-described SDT will now be described.

If a service 1 including a base view video element and an audio element and a service 2 including an enhancement view video element are received via a terrestrial channel, an SDT for the service 1 includes signaling information of the base view video element and the audio element. service_combine_type in service_combine_descriptor included in a descriptor loop of the SDT for the service 1 is set to 001 and associated_service_TSID indicates transport_stream_id of a transport stream including an element of the service 2. In addition, associated_service_original_network_id and associated_service_id may be used to obtain information about the associated service (service 2).

If the reception device is in a 2D mode, only the element of the service 1 may be used. The SDT and the PMT for the service 2 include signaling information of the enhancement view video element. service_combine_type included in service_combine_descriptor of the SDT for the service 2 is set to 010 and associated_service_TSID indicates transport_stream_id of a transport stream including the element of the service 1. associated_service_original_network_id and associated_service_id may be used to obtain information about the associated service (service 1)

The reception device combines the elements of the service 1 and the service 2 so as to provide a complete 3D stereoscopic image service.

Figure 30:
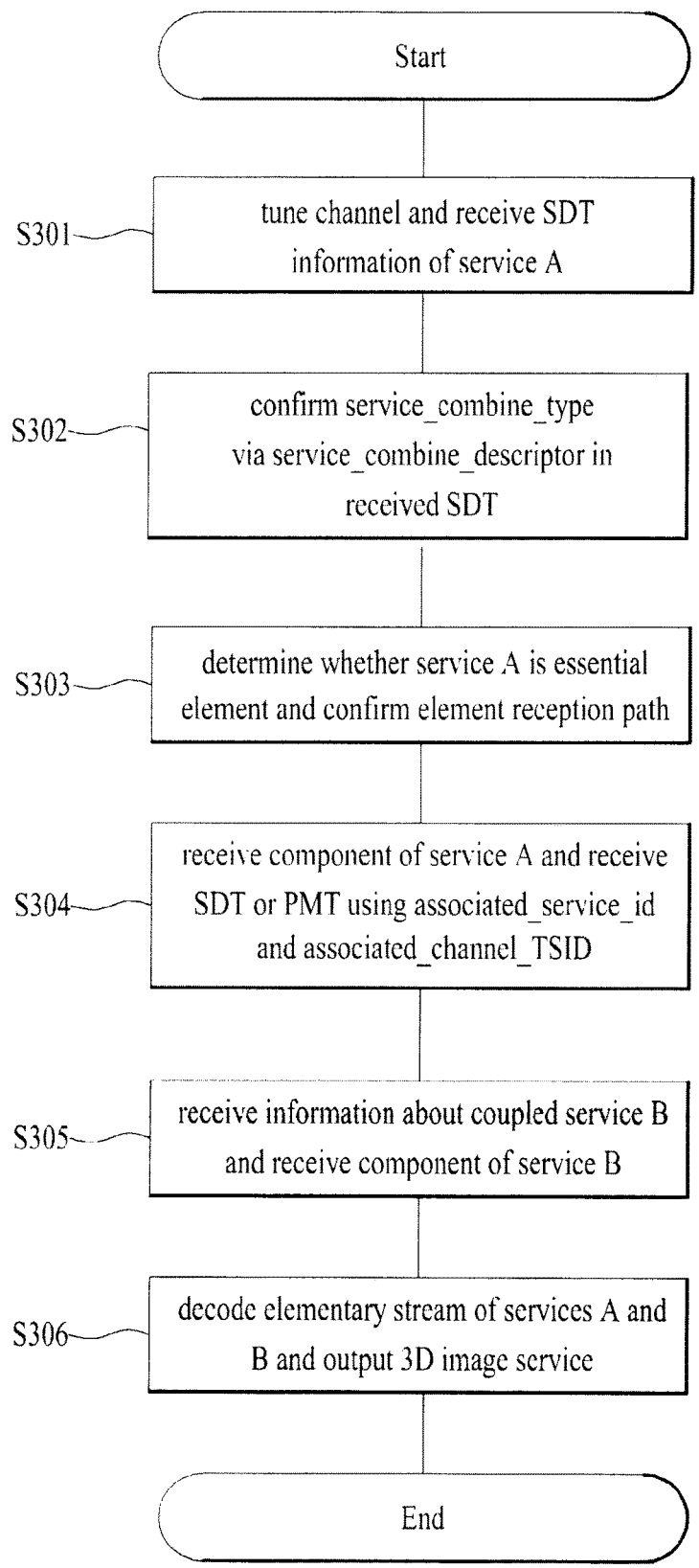
FIG. 30 is a flowchart illustrating a method of providing 3D image signal information in a multi-path environment using an SDT according to an embodiment of the present invention.

FIG. 30 is a flowchart illustrating a method of providing 3D image signal information in a multi-path environment using an SDT according to an embodiment of the present invention.

The digital broadcast reception device receives SDT information of a selected service A after channel tuning (S301). A determination as to whether the program includes all elements (service_combine_type=0) using service_combine_type information of service_combine_descriptor is made. If so not, a determination as to whether the program is an essential element or an enhancement element is made (S302). In addition, a determination as to whether a path for receiving another complementary component is the same terrestrial channel or the Internet is made using a service_combine_type field (S303). Subsequently, a component (elementary stream) corresponding to the service A is received.

A time when a service B is available is confirmed using the service_sync_type field. Therefore, it is possible to determine whether simultaneously reception is currently possible or reception is performed later. The SDT (or PMT) corresponding to associated_service_TSID and associated_service_id confirmed via service_combine_descriptor is received (S304). At this time, a process of further tuning another channel may be generated according to circumstances.

If an enhancement stream needs to be received, information about the service B is received via the SDT in the previous step and a component (elementary stream) corresponding to the service B is received (S305).

Both the elementary streams included in the service A and the service B may be decoded to display a complete 3D image service (S306). Alternatively, only a necessary part may be selectively decoded.

If the service B is not currently available but may be available later, the service A is received and stored (recorded) and the stream of the stored service A is played back when the service B is received and is combined with the service B, thereby providing a 3D image.

FIG. 31 is a diagram showing the syntax structure of an EIT of DVB-SI including event_combine_descriptor according to an embodiment of the present invention.

The digital broadcast reception device of the present invention may include the above-described service_combine_descriptor( ) or event_combine_descriptor( ) or an extension of linkage_descriptor( ) in the descriptor of the EIT of DVB-SI and transmit the descriptor, thereby providing information about a 3D image service.

A table_id field has a size of 8 bits and indicates that this section belongs to a service description table.

A section_syntax_indicator field has a size of 1 bit and the value thereof is set to 1.

A section_length field has a size of 12 bits and indicates the number of bytes of a section including CRC after this field. The value of this field does not exceed 4093 and the total length of the section is a maximum of 4096 bytes.

A source_id field has a size of 16 bits and serves as a label for distinguishing this service from another service in a TS. service id has the same value as program_number of program_map_section.

A version_number field has a size of 5 bits and indicates the version number of sub_table. The value of this field is incremented by one whenever sub_table is changed. If the version value reaches 31, a next version value is 0.

A current_next_indicator field has a size of 1 bit and the value thereof is set to 1 if sub_table is currently applicable. If the value of this field is set to 0, this means sub_table is not applied yet and a next table is valid.

A section_number field has a size of 8 bits and indicates the number of sections. A first section has a value of 0x00 and the value of this field is incremented by one whenever a section having the same table_id, the same transport_stream_id and the same original_network_id is added.

A last_section_number has a size of 8 bits and indicates the number of a last section (that is, highest section_number) of sub_table including this section.

A transport_stream_id field has a size of 16 bits and serves as a label for distinguishing between TSs.

An original_network_id field has a size of 16 bits and is a label for identifying network_id of a transmission system.

A segment_last_section_number field has a size of 8 bits and indicates the number of the last section of the section of sub_table. This field has the same value as the last_section_number field with respect to sub_table which is not divided into segments.

A last_table_id field has a size of 8 bits and indicates lastly used table_id.

An event_id field has a size of 16 bits and includes an id number indicating an event (which is uniquely assigned in service definition).

A start_time field has a size of 40 bits and indicates a start time of this event in the Universal Time, Co-ordinated (UTC) form or modified Julian Date (MJD) form. This field is composed of 16 bits coded by 16 LSBs of MJD and 24 bits coded to 6-digit 4-bit binary coded decimal (BCD). If the start time is not defined (e.g., an NVOD service), all bits are set to 1.

A duration field has 24 bits and includes the duration of the event in hours, minutes or seconds. Accordingly, the value of this field is represented by 6-digit 4-bit BCD and has 24 bits.

A running_status field has a size of 3 bits and indicates an event status. In case of an NVOD event, the value of this field is set to 0.

A free_CA_mode field has a size of 1 bit. If the value of this field is set to 0, this means that all elementary streams of this service are not scrambled. If the value of this field is set to 1, this means that one or more streams are controlled by a CA stream.

A descriptors_loop_length has a size of 12 bits and indicates the total length of a following descriptor in bytes.

A CRC_32 field has a size of 32 bits and indicates a CRC value for zero output of a register in a decoder.

First, if service_combine_descriptor( ) is transmitted within the descriptor of the EIT of DVB-SI, the above-described service_combine_descriptor( ) may be transmitted within the EIT of the service for transmitting the base video stream. In this case, an additional stream channel is present with respect to only this event. Accordingly, the additional stream channel is valid only during the broadcast period of this event.

If associated channel information of the event is signaled using service_combine_descriptor( ), the associated channel of this event is confirmed using associated_service_TSID, associated_service_original_network_id, associated_service_id, etc.

Next, if event_combine_descriptor( ) is included in the descriptor of the EIT of DVB-SI, an event A is a base video event and an event B is an enhancement video event, event_combine_descriptor( ) including associated information of event B is located in a descriptor loop for event A of the EIT.

FIG. 32 is a diagram showing the syntax structure of event_combine_descriptor according to an embodiment of the present invention.

event_combine_descriptor( ) may include descriptor_tag, descriptor_length, event_combine_type, linked_event_id, linked_TSID, linked_original_netrowk_id, linked_service_id, internet_linkage_information( ), event_sync_type and/or avail_time_start.

Hereinafter, this information will be described.

descriptor_tag has a size of 8 bits, serves as an ID of the descriptor and may be allocated a value of 0xTBD.

descriptor_length has a size of 8 bits and includes information about the number of bytes included in the descriptor.

event_combine_type has a size of 3 bits and indicates the type of an event signaled by an EIT section.

FIG. 33 is a diagram showing event_combine_type according to an embodiment of the present invention. If event_combine_type is 000, this means that the event includes all components necessary for a 3D image service. For example, event may include all of a base video, an enhancement video, a left image and a right image.

If event_combine_type is 001, this means that the event includes a part of components for the 3D image service and the part includes an essential element. The remaining components for serving a complete 3D image are received by the same medium type as the event and the remaining components may be obtained using linked_TSID and linked_service_id. In the worst case, for example, if the remaining components cannot be received, only the part of the 3D image service may be rendered. In this case, it is possible to provide a 2D video service using a base video.

If event_combine_type is 010, this means that the event includes a part of components for the 3D image service and the part does not include an essential element. The event may not provide any meaningful presentation to a user. The event must be combined with the essential element included in another event identified by linked_TSID and linked_service_id in order to provide a 3D image service. The essential element is received by the same medium type as the event.

If event_combine_type is 011, this means that the event includes a part of components for the 3D image service and the part includes an essential element. The remaining components for serving a complete 3D image are received via the Internet and a URL indicating the locations of the remaining components may be obtained via internet_linkage_information. In the worst case, for example, if the remaining components cannot be received, only the part of the 3D image service may be rendered. In this case, it is possible to provide a 2D video service using a base video.

If event_combine_type is 100, this means that the event includes a part of components for the 3D image service and the part does not include an essential element. The event may not provide any meaningful presentation to a user. The essential element is received via the Internet and the event must be combined with the essential element in order to provide a 3D image service. Access information of the essential element may be obtained through internet_linkage_information.

A linked_event_id field has a size of 16 bits and indicates an event_id value of an event to be combined with this event in order to provide a complete 3D image service.

A linked_TSID field has a size of 16 bits and indicates transport_stream_id of a transport stream for transmitting a PMT for signaling information of an enhancement stream.

A linke_original_network_id field has a size of 16 bits and indicates an original_network_id value of a service or program including a stream to be combined with this event in order to provide a complete 3D image service.

A linked_service_id has a size of 16 bits and indicates a service_id value of a service or program including a stream to be combined with this event in order to provide a 3D image service. This service_id value is equal to the program_number value of the PMT section and thus linked_service_id may be represented by linked_program_number.

internet_linkage_information may include an IP address, a field indicating that the IP address has 32 bits or 128 bits, a port number, supplementary information (e.g., a URL of the stream) and available time slot (start time and end time) information.

An event_sync_type field has a size of 3 bits and includes information indicating how the components of the 3D image service are obtained and synchronized.

FIG. 34 is a diagram showing event_sync_type according to an embodiment of the present invention.

If event_sync_type is 000, the 3D image service may be provided only via synchronous 3D delivery.

If event_sync_type is 001, the 3D image service may be provided only via asynchronous 3D delivery. The remaining part for providing the 3D image service is transmitted afterward. In order to receive the remaining part, the reception device may use link information such as linked_event_id, linked_TSID, linked_service_id, linked_original_network_id and internet_linkage_information.

If event_sync_type is 010, the 3D image service may be provided only via asynchronous 3D delivery. The remaining part for providing the 3D image service is transmitted previously. In order to receive the remaining part, the reception device may use link information such as linked_event_id, linked_TSID, linked_service_id, linked_original_network_id and internet_linkage_information.

If event_sync_type is 011, the 3D image service may be provided via synchronous 3D delivery or asynchronous 3D delivery. The remaining part for providing the 3D image service is transmitted simultaneously with the current event or afterward. In order to receive the remaining part, the reception device may use link information such as linked_event_id, linked_TSID, linked_service_id, linked_original_network_id and internet_linkage_information.

If event_sync_type is 100, the 3D image service may be provided via synchronous 3D delivery or asynchronous 3D delivery. The remaining part for providing the 3D image service is transmitted simultaneously with the current event or previously. In order to receive the remaining part, the reception device may use link information such as linked_event_id, linked_TSID, linked_service_id, linked_original_network_id and internet_linkage_information.

An avail_time_start field has a size of 32 bits and means a start time when a separate stream which may be combined with the stream of the current service to provide one 3D image service is transmitted. avail_time_start indicates a start time of this event as the number of GPS seconds since 00:00:00 UTC, 6 Jan. 1980. This field is meaningful only when the value of the event_sync_type field is "001" or "011".

Detailed information regarding a video stream included in a linked event may be confirmed by referring to the component descriptor of a service including this event or by including a component_tag value or an elementary_PID value of the component in the above-described event_combine_descriptor and checking this field. That is, according to embodiments, a component_tag or elementary_PID field of a video/audio stream associated with event_combine_descriptor may be included or stream related information such as stream_content and component_type may also be included.

The digital broadcast receiver of the present invention may receive and combine a base video and an enhancement video of a 3D image service using signal information included in the above-described event_combine_descriptor( ) so as to display a 3D image.

An embodiment of a digital broadcast reception method using the above-described EIT of DVB-SI will now be described.

If an event A including a base view video element and an audio element and a service B including an enhancement view video element are received via a terrestrial channel, an EIT for event A includes signaling information of the base view video element and the audio element. event_combine_type in event_combine_descriptor of the EIT for event A is set to 001 and linked_TSID indicates transport_stream_id of a transport stream including an element of the service B. In addition, linked_service_id may be used to obtain information about the service B. If the reception device is in a 2D mode, only the element of event A may be used. The SDT and the PMT for the service B include signaling information of the enhancement view video element.

event_combine_type included in event_combine_descriptor of the SDT for the service B is set to 010 and linked_TSID indicates transport_stream_id of a transport stream including the element of event A. In addition, linked_service_id may be used to obtain information about event A. The digital broadcast reception device of the present invention may combine the elements of event A and the service B so as to provide a complete 3D stereoscopic image service.

Figure 35:
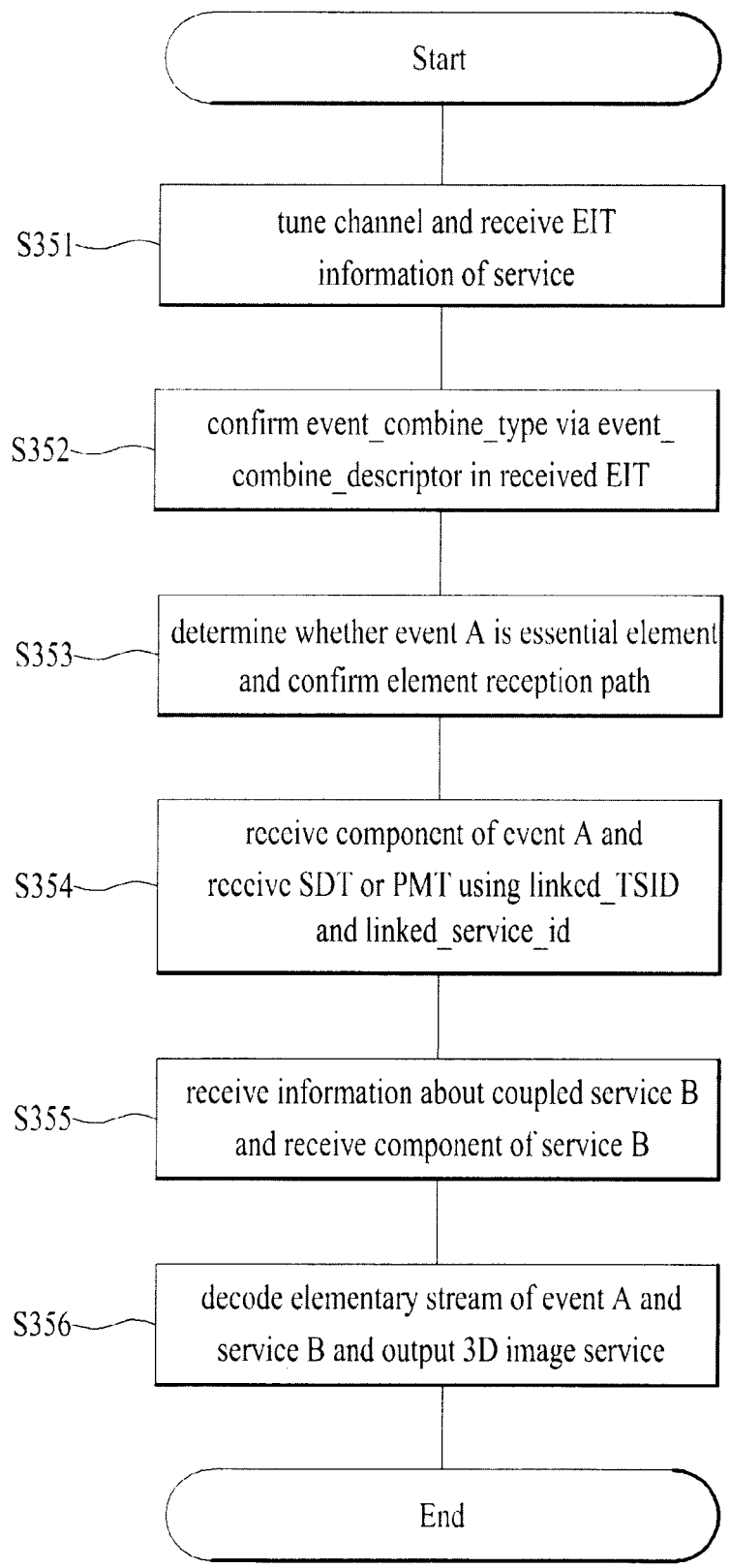
FIG. 35 is a flowchart illustrating a method of providing 3D image signal information in a multi-path environment using an EIT of DVB-SI according to an embodiment of the present invention.

FIG. 35 is a flowchart illustrating a method of providing 3D image signal information in a multi-path environment using an EIT of DVB-SI according to an embodiment of the present invention.

The digital broadcast reception device receives EIT information of a selected service after channel tuning (S351). A determination as to whether the program includes all elements (service_combine_type==0) using event_combine_type information of event_combine_descriptor is made. If so not, a determination as to whether the event is an essential element or an enhancement element is made (S352). In addition, a determination as to whether a path for receiving another complementary component is the same terrestrial channel or the Internet is made using an event_combine_type field (S353). Subsequently, a component (elementary stream) corresponding to event A is received.

A time when a linked channel is available is confirmed using the event_sync_type field and the avail_time_start field. Therefore, it is possible to determine whether simultaneous reception is currently possible or reception is performed later. The SDT (or PMT) corresponding to linked_TSID and linked_service_id confirmed via event_combine_descriptor for event A is received (S354). At this time, a process of further tuning to another channel may be generated according to circumstances.

If an enhancement stream needs to be received, information about a service B is received via the SDT in the previous step and a component (elementary stream) corresponding to the service B is received (S355).

Both the elementary streams included in event A and the service B may be decoded to display a complete 3D image service (S306). Alternatively, only a necessary part may be selectively decoded.

If the service B is not currently available but may be available later, event A is received and stored (recorded) and the stream of the stored event A is played back when the service B is received and is combined with the service B, thereby providing a 3D image.

Next, if linkage_descriptor( ) is included in the descriptor of the EIT of DVB-SI, two different services or two different events may be combined to use linkage_descriptor( ) of DVB-SI in order to provide one 3D image service and new linkage_type is specified with each case.

FIG. 36(a) is a diagram showing linkage_descriptor( ) according to an embodiment of the present invention.

linkage_descriptor( ) may include descriptor_tag, descriptor_length, transport_stream_id, original_network_id, service_id, linkage_type, service_combine_info( ) and/or event_combine_info( ).

Hereinafter, this information will be described.

descriptor_tag has a size of 8 bits and serves as an ID of the descriptor.

descriptor_length has a size of 8 bits and includes information about the number of bytes included in the descriptor.

A transport_stream_id field has a size of 16 bits and identifies a transport stream of an information service.

An original_network_id has a size of 16 bits and identifies a network ID of an original transmission system.

A service_id field has a size of 16 bits and uniquely identifies an information service within a transport stream. This is set equally to program_number of a corresponding PMT section.

A linkage_type has a size of 8 bits and sub-divides the linkage type. In the present invention, 0x0F and 0x10 are newly defined. FIG. 36(b) is a diagram showing linkage_type according to an embodiment of the present invention. linkage_type 0x0F means a service combine linkage and linkage_type 0x10 means event combine linkage.

In case of service combine linkage, linkage_descriptor( ) is located in the SDT and the reception device obtains service_combine_info( ), detailed information of which includes all the fields of the above-described service_combine_descriptor( ). The reception device obtains event_combine_info( ), detailed information of which includes all the fields of the above-described event_combine_descriptor( ).

The essential element (base video stream) described in service_combine_descriptor( ) and event_combine_descriptor( ) respectively included in the SDT and the EIT are transmitted via a service defined as an essential service and this service may provide a 2D video service alone. Service_type of this service has a value of 0x19 for compatibility with the existing reception device.

In addition, a non-essential video (enhancement video) is transmitted as a non-essential service and this service may not provide any meaningful service to a user. Service_type of this service may use the existing HD DTV service type or newly define an enhanced service type including an enhancement video.

FIG. 37 is a diagram showing a service type of a non-essential service according to an embodiment of the present invention. service_type 0x19 means an advanced codec HD digital television service and 0x1F means a non-essential stereoscopic service including only an enhancement video stream.

stream_content and component_type of a non-essential service may use a combination of stream_content and component_type of the existing HD video (MPEG-2 or H.264/AVC) or newly define a combination only for an enhancement video, as shown in FIG. 37(b).

A service for providing the above-described base video stream and enhancement video stream is used as a dual-stream service. If this service is used, it is possible to provide a 2D image service as well as a 3D image service.

service_type may use the existing service type compatible with a 2D HD service or a new service type. FIG. 37(c) is a diagram showing a service type of a dual-stream service according to an embodiment of the present invention. service_type 0x19 means a dual-stream stereoscopic service including both a base video stream and an enhancement video stream.

stream_content and component_type of a dual-stream service may use a combination of stream_content and component_type of the existing HD video (MPEG-2 or H.264/AVC) or newly define a combination only for an enhancement video, as shown in FIG. 37(b).

Up to now, the device and method for receiving and combining the base video stream and the enhancement video stream via a single channel or a plurality of channels to provide a 3D image service has been described. Hereinafter, a device and method for receiving depth data of a 3D image instead of an enhancement video stream, rendering the enhancement video stream, and providing a 3D image service will be described.

If a 3D image signal includes a 2D video element and depth data for a depth map (or a disparity map), the 2D video element is transmitted via the existing terrestrial TV channel and the depth data is transmitted over the Internet. At this time, the depth map may include occlusion and transparency information as necessary. That is, in the present specification, data combined with a 2D video element (base video, left image) to generate an enhancement video (right image) of a stereoscopic image is referred to as depth data, for convenience.

Figure 38:
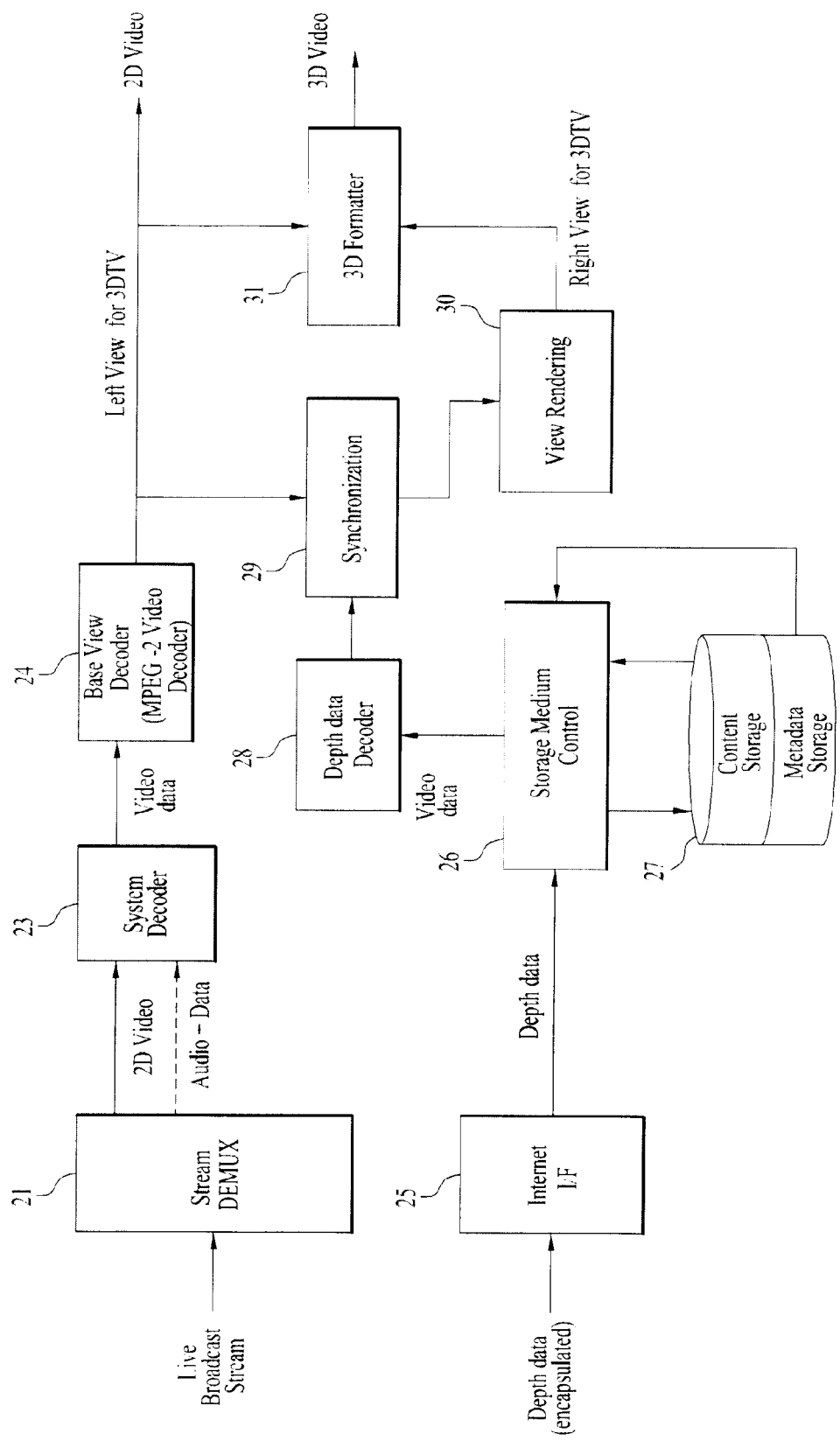
FIG. 38 is a diagram showing a digital broadcast reception device for providing a 3D image service using depth data according to an embodiment of the present invention.

FIG. 38 is a diagram showing a digital broadcast reception device for providing a 3D image service using depth data according to an embodiment of the present invention.

The digital broadcast reception device of FIG. 38 includes a stream demultiplexer 21, a system decoder 23, a base video decoder 24, an Internet interface 25, a memory controller 26, a content and metadata memory 27, a depth data decoder 28, a synchronizer 29, a rendering unit 30 and/or an output formatter 31.

The digital broadcast reception device receives a broadcast stream via a tuner (not shown) and demultiplexes a 2D video stream from the stream using the demultiplexer 21. The 2D video stream is input to the system decoder 23 to be decoded into video data and the base video decoder 24 generates a base video (left image) signal. Using this signal, the existing reception device may display a 2D image signal.

Depth data is received via the Internet interface 25 and is stored in the content and metadata memory 27 by the memory controller 26. In addition, the depth data is input to and decoded by the depth data decoder 28 and is input to and synchronized with a base video signal decoded by the base video decoder 24 by the synchronizer 29. The rendering unit 30 may generate an enhancement video signal using the base video signal and the depth data. The generated enhancement video signal is combined with the base video signal by the output format 31 to display a 3D stereoscopic image signal.

A process of outputting a 3D image signal uses a method of coupling previously received depth data with a 2D image signal received in real time to render an enhancement video. This process is similar to real-time 2D-to-3D conversion but has high reliability in terms of quality and accuracy of a 3D image in that a content provider provides depth data and the depth data is available in the receiver before a 2D image signal is received.

In order to couple a 2D image signal and depth data to generate a stable 3D image signal, the following considerations are necessary.

First, signaling of combination information of the 2D image signal and the depth data is necessary. As an example, presence signaling which is information indicating presence/absence of the depth data combined with the 2D image signal, location signaling which is information about a path (location) of the depth data coupled with the 2D image signal, synchronization/coupling mode signaling which is information about a synchronization or coupling mode of the depth data coupled with the 2D image signal, available time signaling which is information about a time when the depth coupled with the 2D image signal is capable of being received, format/codec signaling which is information about the format or codec of the depth data coupled with the 2D image signal, depth range signaling for providing a method of transmitting several pieces of depth data in order to provide a 3D image signal having various depth ranges and depth range information of each depth data are necessary.

Next, frame level synchronization information for coupling the 2D image signal with the depth data is necessary. As an example thereof, video level signaling and transport stream level signaling are necessary.

In association with the operation of the reception device, it is necessary to take a method of receiving and storing depth data coupled with a 2D image signal, a method of supporting various depth modes and multiple depth maps (depth tracks) into consideration.

In addition, in association with a method of preventing all the above-described information from influencing the normal operation of a 2D or 3D reception device, a method of acquiring access information of enhancement data including depth data via a channel over which a 2D image signal is received is considered and a channel via which enhancement data (hereinafter, the enhancement data includes depth data) is received may not provide an independent service and must transmit and receive non-meaningful signaling information.

Next, a descriptor for signaling enhancement data via a PSI/PISI/SI section will be defined. For convenience, although the descriptor does not include a loop, multiple enhancement data may be transmitted according to circumstances and, at this time, the descriptor must repeat the field by the number of transmitted enhancement data streams. In particular, this corresponds to the case of implementing depth control through multiple depth map transmission.

FIG. 39 is a diagram showing the syntax of event_enhancement_descriptor( ) according to an embodiment of the present invention.

event_enhancement_descriptor( ) may be transmitted within the EIT of FIG. 20 so as to signal enhancement data coupled with the event.

event_enhancement_descriptor( ) may include descriptor_tag, descriptor_length, combined_service_type, enhancement_type, enhancement_right_flag, sync_type, enhancement_stream_format, enhancement_stream_sampling_factor, avail_time_start, linked_TSID, linked_program_number, internet_linkage_information and disparity_near, disparity_far.

combined_service_type indicates a field indicating a service ultimately provided when two or more components which are received/transmitted via different paths/channels are combined. That is, this means a final service provided by combining the event and the enhancement data received via the location specified in event_enhancement_descriptor( ).

FIG. 40(a) is a diagram showing combined_service_type according to an embodiment of the present invention. If combined_service_type is set to a value of 0x01, this means a 3D stereoscopic image service described in the present invention. Hereinafter, the case in which combined_service_type is 0x01, that is, the 3D stereoscopic service will be focused upon in the present invention.

combined_service_type indicates the type of a path via which enhancement data for the event is transmitted and may be a terrestrial channel or the Internet, for example. FIG. 40(b) is a diagram showing enhancement_type according to an embodiment of the present invention.

If enhancement_type is set to 0x0, this means that the event includes all components necessary for a 3D image service. That is, the enhancement data may also be received in a state of being included as the component of the event.

If enhancement_type is set to 0x1, the enhancement data is received via another channel/path and the type of a reception path is equal to that of the event. For example, if the event is received via a terrestrial channel, the enhancement data is also received via another terrestrial channel. Detailed path information of the enhancement data uses linked_TSID and linked_program_number.

If enhancement_type is set to 0x2, this corresponds to the case in which the event includes only the enhancement data and essential data is transmitted via the same type of path. That is, both enhancement data and essential data are received via a terrestrial channel. Detailed path information of the essential data uses the linked_TSID and linked_program_number fields.

If enhancement_type is set to 0x3, enhancement data for the event is received via the Internet. Path information for access of the enhancement data uses internet_linkage_information.

enhancement_right_flag indicates the left view/right view of the image when rendering the view of the 3D stereoscopic image service using enhancement data. If this value is "1", the enhancement data or the view acquired via the enhancement data is a right view video.

sync_type indicates information about a method of synchronizing and combining transmission of enhancement data and the component of the event. FIG. 40(c) is a diagram showing sync_type according to an embodiment of the present invention.

If sync_type is set to 0x0, this means that the component of this event and the enhancement data are simultaneously transmitted, that is, synchronized transmission.

If sync_type is set to 0x1, the enhancement data is transmitted later than this event. In order to normally view a 3D image, this event is recorded and then is coupled/combined with the enhancement data received later.

If sync_type is set to 0x2, the enhancement data was already transmitted before this event. In order to normally view a 3D image, the component of the event received in real time and the already received/stored enhancement data are coupled/combined.

If sync_type is set to 0x3, this is similar to sync_type of 0x1 but means that synchronized transmission of the enhancement data is possible.

If sync_type is set to 0x4, this is similar to sync_type of 0x2 but means that synchronized transmission of the enhancement data is possible.

enhancement_stream_format indicates information data format and codec of the enhancement data of this event. FIG. 41(a) is a diagram showing enhancement_stream_format according to an embodiment of the present invention. In the present invention, the case of transmitting depth/disparity data will be described. If enhancement_stream_format is 0x25, this indicates depth/disparity map coded into MPEG-2 video and, if enhancement_stream_format is 0x26, this indicates depth/disparity map coded into H.264/AVC video.

enhancement_stream_sampling_factor means resolution of enhancement data and means a sampling factor in vertical and horizontal directions as compared to a video stream (base video) of this event. FIG. 41(b) is a diagram showing enhancement_stream_sampling_factor according to an embodiment of the present invention. If enhancement_stream_sampling_factor is 0x00, this indicates the same resolution as the base video and, if enhancement_stream_sampling_factor is 0xXY, this indicates that width resolution is 1/(X+1) of the resolution of the base video and the height resolution is 1/(Y+1) of the resolution of the base video. For example, in case of depth/disparity map having a size of ¼ in the width and a size of ⅛ in the height, this field has a value of 0x37.

An avail_time_start field means a start time when enhancement data combined with the component of the current event to configure 3D image content is transmitted. The avail_time_start field has a size of 32 bits and indicates a start time of this event as the number of GPS seconds since 00:00:00 UTC, 6 Jan. 1980. If the value of this field is 0, this means that the enhancement data is always available.

linked_TSID means a transport_stream_id value of a transport stream including enhancement data.

linked_program_number indicates a program_number value of a program/channel including enhancement data. That is, it is possible to uniquely identify a stream including enhancement data using linked_TSID and linked_program_number.

internet_linkage_information provides information about enhancement data transmitted via the internet and may include the following information.

internet_linkage_information may include an IP address, a field indicating that the IP address has 32 bits or 128 bits, a port number, supplementary information (e.g., a URL of the stream) and available time slot (start time and end time) information. At this time, available time slot information may include the same information as the avail_time_start field.

disparity_near and disparity_far indicate the range of a depth if the enhancement data is disparity/depth map, that is, respectively indicate disparity values corresponding to an object point nearest to and an object point farthest from a user.

In event_enhancement_descriptor( ), it is possible to signal a plurality of enhancement streams. For signaling, n enhancement streams may be signaled using a loop in event_enhancement_descriptor( ).

FIG. 42 is a diagram showing the syntax of program_enhancement_descriptor( ) according to an embodiment of the present invention.

program_enhancement_descriptor( ) may be included in the PMT of FIG. 8 to signal enhancement data coupled with a program or a program element. program_enhancement_descriptor( ) provides information about enhancement data coupled with this program to implement a 3D image service. At this time, the provided information indicates only whether the enhancement data is coupled with the program and does not provide with which event the enhancement data is coupled or whether the enhancement data is coupled in real time/non-real time.

program_enhancement_descriptor( ) includes descriptor_tag, descriptor_length, combined_service_type, enhancement_type, enhancement_right_flag, sync_type, enhancement_stream_format, enhancement_stream_sampling_factor, linked_TSID, linked_program_number, linked_elementary_PID, internet_linkage_information, and disparity_near, disparity_far.

The fields included in program_enhancement_descriptor( ) equal to the fields of event_enhancement_descriptor( ) described with reference to FIG. 39 and only fields different from those shown in FIG. 39 will be described.

enhancement_type indicates the type of a path via which enhancement data for this program is transmitted, for example, a terrestrial channel or the Internet. enhancement_type included in program_enhancement_descriptor( ) is applied in program units, not in event units.

linked_elementary_PID is not necessary essential in program_enhancement_descriptor( ) and may be omitted according to embodiments.

FIG. 43 is a diagram showing the syntax of channel_enhancement_descriptor( ) according to an embodiment of the present invention.

channel_enhancement_descriptor( ) is included in the TVCT of FIG. 14 to signal information about enhancement data coupled with the component of this virtual channel at a virtual channel level to provide a 3D image service. This information indicates whether the enhancement data is coupled with the channel and does not provide information detailed information of event units and real-time/non-real-time coupling.

channel_enhancement_descriptor( ) includes descriptor_tag, descriptor_length, combined_service_type, enhancement_type, enhancement_right_flag, sync_type, enhancement_stream_format, enhancement_stream_sampling_factor, linked_TSID, linked_program_number, linked_major_channel_number, linked_minor_channel_number, linked_source_id, linked_elementary_PID, internet_linkage_information, disparity_near, and disparity_far.

enhancement_type indicates the type of a path via which enhancement data for this virtual channel is transmitted, for example, a terrestrial channel or the Internet. The meaning of the value of this field is equal to that defined in event_enhancement_descriptor( ) and program_enhancement_descriptor( ) and is different therefrom that this field is applied in virtual channel units, not in event units or program units.

linked_channel_TSID indicates a transport_stream_id value of a program/channel including a stream to be combined with this program/channel in order to provide a complete 3D image service.

linked_channel_program_number indicates a program_number value of a program/channel including a stream to be combined with this program/channel in order to provide a complete 3D image service.

linked_major_channel_number indicates a major_channel_number value of a program/channel including a stream to be combined with this program/channel in order to provide a complete 3D image service.

linked_minor_channel_number indicates a minor_channel_number value of a program/channel including a stream to be combined with this program/channel in order to provide a complete 3D image service.

linked_source_id indicates a source_id value of a channel including a stream to be combined with this program/channel in order to provide a complete 3D image service.

The description of the other fields are equal to the description of the fields of event_enhancement_descriptor( ) described with reference to FIG. 39.

FIG. 44 is a diagram showing the syntax of service_enhancement_descriptor( ) according to an embodiment of the present invention. service_enhancement_descriptor( ) is included in the SDT of FIG. 26 to signal information about enhancement data coupled with this service at a service channel level to provide a 3D image service. This information indicates presence of data coupled with the service and does not provide information detailed information of event units and real-time/non-real-time coupling.

service_enhancement_descriptor( ) includes descriptor_tag, descriptor_length, combined_service_type, enhancement_type, enhancement_right_flag, sync_type, enhancement_stream_format, enhancement_stream_sampling_factor, linked_TSID, linked_original_network_id, linked_service_id, internet_linkage_information, disparity_near and disparity_far.

enhancement_type indicates the type of a path via which enhancement data for this service is transmitted, for example, a terrestrial channel or the Internet. The meaning of the value of this field is equal to that defined in the description of FIG. 39 and is different therefrom that this field is applied in service units, not in event units.

linked_original_network_id indicates an original_network_id value of a service including a stream to be combined with this program/channel in order to provide a complete 3D image service.

linked_service_id indicates an service_id value of a service including a stream to be combined with this program/channel in order to provide a complete 3D image service.

In the present embodiment, since the values of service_id and program_number fields are equally set, the linked_program_number field is omitted. According to circumstances, the linked_program_number field may be included in service_enhancement_descriptor( ).

Detailed information regarding a video stream corresponding to enhancement data may be confirmed by referring to component_descriptor of this service or by including a component_tag value or an elementary_PID value of the component in the above-described service_enhancement_descriptor( ) and checking that field. That is, according to embodiments, a linked_component_tag or linked_elementary_PID field for a coupled video/audio stream may be included in service_enhancement_descriptor( ) and stream related information such as linked_stream_content and linked_component_type may be included. The description of the other fields are equal to the description of the fields of event_enhancement_descriptor( ) described with reference to FIG. 39.

In addition to the method of using the above-described service_enhancement_descriptor( ), as described with reference to FIG. 36, information about enhancement data for this service may be signaled using linkage_descriptor( ) of a service level. In this case, information about enhancement data coupled with a service is included in linkage_descriptor( ) and is equal to service_enhancement_descriptor( ).

FIG. 45 is a diagram showing the syntax structure of event_enhancement_descriptor( ) according to an embodiment of the present invention. event_enhancement_descriptor( ) is included in the EIT of DVB_SI of FIG. 31 to signal information about enhancement data coupled with this event for providing a 3D image service.

event_enhancement_descriptor( ) included in the EIT of DVB-SI includes descriptor_tag, descriptor_length, combined_service_type, enhancement_type, enhancement_right_flag, sync_type, enhancement_stream_format, enhancement_stream_sampling_factor, avail_time_start, linked_event_ID, linked_TSID, linked_original_network_id, linked_service_id, internet_linkage_information, disparity_near and disparity_far.

linked_event_ID indicates an event_id value of an event to be combined with this event in order to provide a complete 3D image service.

linked_original_network_id indicates an original_network_id value of a service including a stream to be combined with this event in order to provide a complete 3D image service.

linked_service_id indicates a service_id value of a service including a stream to be combined with this event in order to provide a complete 3D image service.

The description of the other fields are equal to the description of the fields of event_enhancement_descriptor( ) included in the EIT of ATSC described with reference to FIG. 39.

In addition to the method of using the above-described event_enhancement_descriptor( ), as described with reference to FIG. 36, information about enhancement data for this event may be signaled using linkage_descriptor( ) of an event level. In this case, information about enhancement data coupled with an event is included in linkage_descriptor( ) and is equal to event_enhancement_descriptor( ).

The digital broadcast signal reception device and method of the present invention includes a restriction element for an enhancement (non-essential) channel/service for backward compatibility with the existing reception device.

Elements configuring a 3D stereoscopic video service receive a base video via an essential channel (legacy compatibility channel) via which a 2D image signal is received, acquires information about enhancement data via PSI/PIIP/SI of the essential channel, and accesses enhancement data using this information.

Fundamentally, a channel for transmitting enhancement data may not provide an independent service and sets the following restriction element in order to prevent malfunction of the existing reception device.

In the TVCT of ATSC, service_type is set to 0x07 (parameterized service) or 0x0A (non-stand-alone type service carrying additional data). In addition, stream_type must indicate depth/disparity data coded into MPEG-2 and depth/disparity data coded into H.264/AVC. When new stream_type is specified, MPEG-2 registration_descriptor is used. For example, if the stream_type value of depth/disparity data coded into H.264/AVC is set to 0x83, a format_identifier field of registration_descriptor has a value of 'DIS1'-(0x4449 5331) and an additional_idenfication_info field has a value of 0x83.

In the SDT/EIT of DVB, service_type is set to 0x1F (non-essential stereoscopic service carrying only additional/enhancement stream). In addition, stream_content and component_type newly define a combination of stream_content and component_type of the existing HD video (MPEG-2 or H.264/AVC) or a combination only for an enhancement video as shown in FIG. 46. FIG. 46 is a diagram showing stream_content and component_type according to an embodiment of the present invention.

The digital broadcast reception device and method of the present invention may determine which codec is used by the component or whether the component is enhancement video or depth/disparity map data using stream_content and component_type information of FIG. 46 inserted into component_descriptor of DVB-SI, decode the component, and provide a 3D image service.

Hereinafter, a synchronization method for providing a 3D image service will be described.

The synchronization method according to the present invention includes a transport packet level synchronization method, a video level synchronization method and a system level synchronization method.

First, the transport packet level synchronization method will be described.

FIG. 47 is a diagram showing transport_packet( ) according to an embodiment of the present invention. The transport packet level synchronization method transmits synchronization information using adaptation_field( ) of a transport packet. A transport packet including a video component received via the existing channel and a transport packet including enhancement data received via a separate channel are matched or aligned to perform synchronization at a transport stream level.

FIG. 48 is a diagram showing adaptation_field( ) according to an embodiment of the present invention. For synchronization, transport_field_extension_flag of adaptation_field( ) is set to 1 and information about private_data_byte is signaled using transport_private_data_length. In addition, frame number information of video/depth is signaled using video_frame_info_data_byte. The reception device controls synchronization of elements configuring the 3D image service received via multiple paths using the above-described information.

FIG. 49(a) is a diagram showing the syntax of video_frame_info_data_byte and video_frame_info according to an embodiment of the present invention. video_frame_info_data_byte is located at private_data_byte of the adaptation_field of the transport packet and has the structure shown in FIG. 49(a). Here, the meaning of video_frame_info is determined according to the setting value of frame_info_type included in video_frame_info_data_byte and is shown in FIG. 49(b).

If frame_info_type is 0x01, video_frame_info means a decoding order number. If video_frame_info means a decoding order number, video decoding structures (GOP structures) of two components must be identical.

If frame_info_type is 0x02, video_frame_info means a display order number. If frame_info_type is 0x03, video_frame_info means a PTS value of a clock frequency of 90 KHz. Here, PTS is an abbreviation for a presentation time stamp and indicates a time when a decoded access unit is played back.

If frame_info_type is 0x04, video_frame_info means an absolute display time. A most significant bit (MSB) of this field is set to 0 and the remaining bits thereof are 32 bits and indicate a time as the number of GPS seconds since 00:00:00 UTC, 6 Jan. 1980.

If frame_info_type is 0x05, video_frame_info means a corrected PTS. This is a time stamp relative to the video_frame_info value of a first picture within a video element set to 0. That is, video_frame_info of an individual picture is a relative count value according to a display time of a first picture of a video element. The unit of the count is equal to the period of a system clock of a frequency of 90 KHz.

Next, the video level synchronization method will be described.

Figure 50:
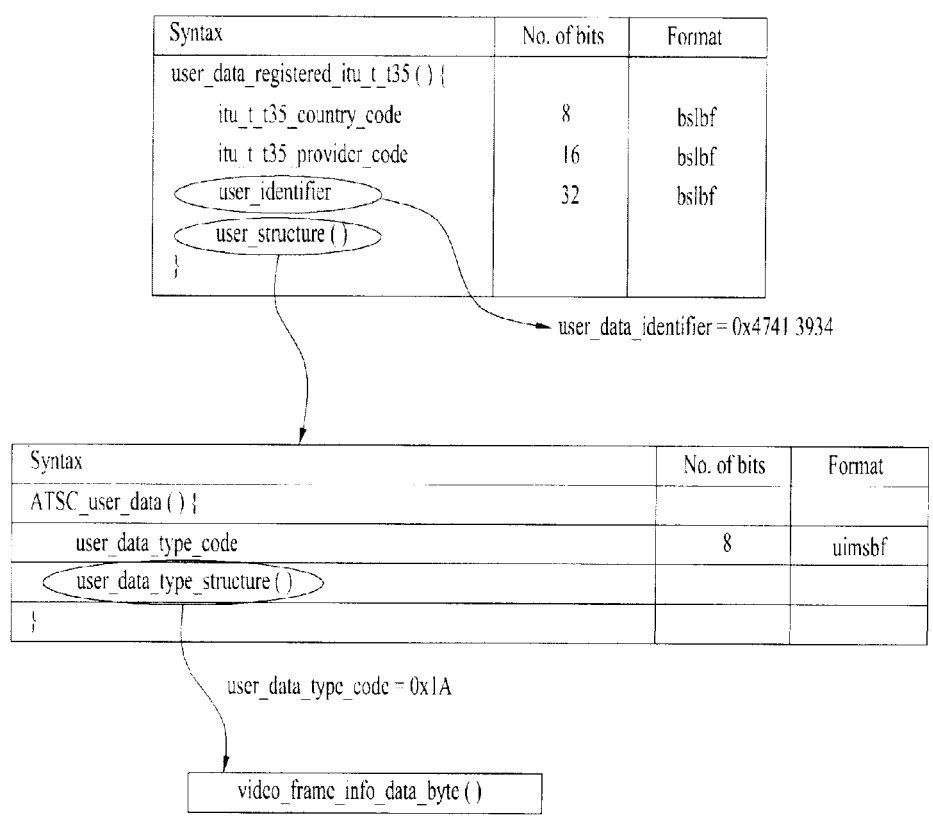
FIG. 50 is a diagram showing a video level synchronization method according to an embodiment of the present invention.

FIG. 50 is a diagram showing a video level synchronization method according to an embodiment of the present invention. In case of AVC/H.264 video, video_frame_info_data_byte is transmitted in frame units using an SEI message. Accordingly, a video_frame_info field included in a user_data_registered_itu_t_135 SEI message included in an AVC/H.264 video stream received via a 2D image signal channel and a video_frame_info field of an SEI message included in an AVC/H.264 video stream for enhancement data may match to perform synchronization for two streams. For reference, itu_t_35_country_code and itu_t_t35_provider_code fields use values specified by ITU-T T.35 recommendations and respectively have values of 0xB5 and 0x0031 in case of ATSC.

In case of MPEG-2 video, video_frame_info_data_byte is transmitted within picture user data.

The system level synchronization method performs synchronization using a PTS included in a PES for an essential video stream (2D video stream) and an enhancement stream. The method of using the PTS value is advantageous in that synchronization of independent elements received via heterogeneous paths is implemented while maintaining the existing specification and is disadvantageous in that it is difficult to set a common clock (PCR) of a PTS due to an independent property of an element and it is impossible to ensure that PTSs of matching frames match even if there is a common clock. As a result, it is necessary to precisely synchronize two codecs even in an encoder part in association with the PTS. In case of non-real-time coupling, it is difficult to perform an operation for enabling a previously stored stream and a stream received in real time to match.

Next, the operation of the reception device will be described.

Figure 51:
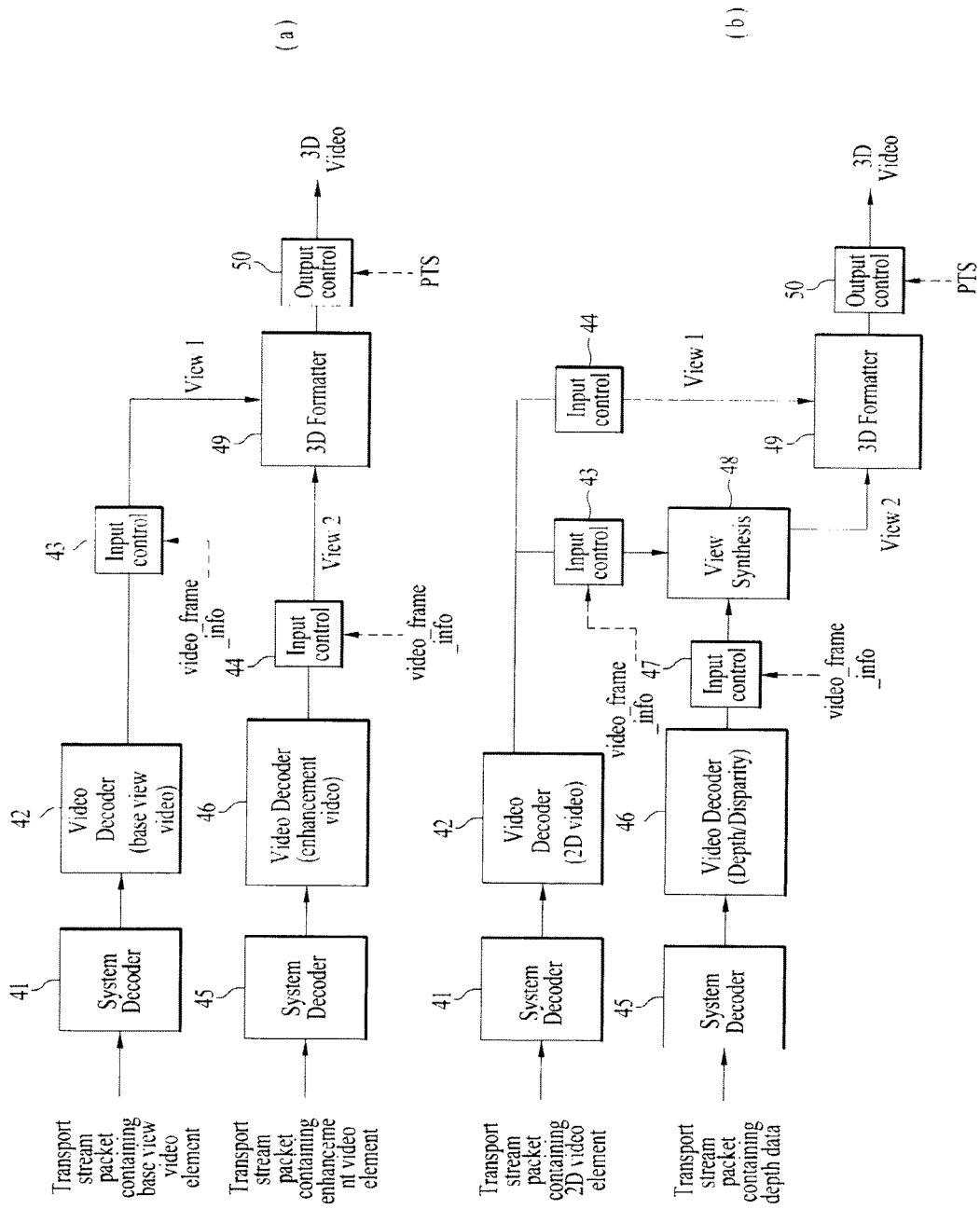
FIG. 51 is a diagram showing a digital broadcast reception device according to an embodiment of the present invention.

FIGS. 51(a) and 51(b) are diagrams showing a digital broadcast reception device according to an embodiment of the present invention. The digital broadcast reception device according to the present invention includes a plurality of system decoders 41 and 45, a plurality of video decoders 42 and 46, a plurality of input controllers 43, 44 and 47, a view synthesizer 48, an output formatter 48 and an output controller 50.

First, video decoding and synchronization and view synthesis for providing a 3D image service using a base video and an enhancement video of FIG. 51(a) will be described. The reception device extracts synchronization information from the base video signal and the enhancement video signal input to the system decoders 41 and 45. The synchronization information may use 1) video_frame_info included in a transport packet, 2) video_frame_info included in an SEI message or user data of a video stream or 3) a PTS value included in a PES packet header as described above. The acquired synchronization information is used to enable the base video signal and enhancement video signal independently decoded by the video decoders 42 and 46 to match. In case of 1) and 3), this information is acquired by the system decoder 41 and 45 and is sent to the input controllers 43 and 44 located just before the output formatter 49 and, in case of 2), the information is acquired by the video decoders 42 and 46 and is sent to the input controllers 43 and 44 located just before the view synthesizer 48.

If video_frame_info is used to synchronize the components of the 3D stereoscopic image signal, output timing information of an actual video uses the existing PTS value without change. That is, for synchronization of two elements received via heterogeneous paths, video_frame_info is used and output timing of an actual 3D view and synchronization of a 3D view and an audio signal is controlled based on a PTS.

The enhancement video (right image or left image) and the base video (left image or right image) are output by a 3D display through the output formatter 49 as a 3D image. The output timing of the 3D image is controlled by the output controller 50 based on a PTS.

Video decoding and synchronization and view synthesis for providing a 3D image service using depth/disparity data of FIG. 51(b) will be described. The reception device extracts synchronization information from a 2D image signal and a depth/disparity stream input to the system decoders 41 and 45. The synchronization information may use 1) video_frame_info included in a transport packet, 2) video_frame_info included in an SEI message or user data of a video stream or 3) a PTS value included in a PES packet header as described above. The acquired synchronization information is used to enable the 2D image signal and the depth/disparity data independently decoded by the video decoders 42 and 46 to match. In case of 1) and 3), this information is acquired by the system decoder 41 and 45 and is sent to the input controllers 43 and 44 located just before the view synthesizer and, in case of 2), the information is acquired by the video decoders 42 and 46 and is sent to the input controllers 43 and 44 located just before the view synthesizer 48.

If video_frame_info is used to synchronize the components of the 3D stereoscopic image signal, output timing information of an actual video uses the existing PTS value without change. That is, for synchronization of two elements received via heterogeneous paths, video_frame_info is used and output timing of an actual 3D view (a combination of other views using 2D+enhancement data) and synchronization of a 3D view and an audio signal are controlled based on a PTS.

The view synthesizer 48 generates another view configuring a 3D stereoscopic image signal using a 2D image signal and depth/disparity data corresponding thereto. As a result, synchronization of the 2D image signal and the depth/disparity stream is performed just before input to the view synthesizer 48.

The enhancement video (right image or left image) generated by view synthesis and the base video (left image or right image) received via the existing channel are output by a 3D display through the output formatter 49 as a 3D image. The output timing of the 3D image is controlled by the output controller 50 based on a PTS.

FIG. 52 is a diagram showing a view synthesis and synchronization operation according to an embodiment of the present invention. FIG. 52(a) shows the order of generating a 3D image signal with the elapse of time when the 3D image signal is provided using a base video and an enhancement video.

At t0, a frame 0 of a base view is obtained by decoding a base video signal and a frame 0 of an enhancement view is obtained by decoding an enhancement video signal. At t1, a frame 1 of a base view is obtained by decoding a base video signal and a frame 1 of an enhancement view is obtained by decoding an enhancement video signal. At this same time, a formatting pair 0 which is a 3D image signal is obtained using the frame 0 of the base view and the enhancement view through the output formatter. Through such a process, the 3D image signal is provided to a user.

FIG. 52(b) shows the order of generating a 3D image signal with the elapse of time when the 3D image signal is provided using a 2D image signal and depth data.

At t0, a frame 0 of a base view is obtained by decoding the 2D image signal and depth information for the frame 0 is obtained by decoding the depth data.

At t1, a frame 1 of the base view is obtained by decoding the 2D image signal and depth information for the frame 1 is obtained by decoding the depth data. At the same time, a frame 0 of an enhancement view is obtained using the frame 0 of the base view and the depth information for the frame 0 through the view synthesizer.

At t2, a frame 2 of the base view is obtained by decoding the 2D image signal and depth information for the frame 2 is obtained by decoding the depth data. At the same time, a frame 1 of the enhancement view is obtained using the frame 1 of the base view and the depth information for the frame 1 through the view synthesizer. At the same time, a formatting pair 0 which is a 3D image signal is obtained using the frame 0 of the base view and the enhancement view through the output formatter. Through such a process, the 3D image signal is provided to a user.

Finally, the method of receiving stereoscopic components at the reception device will be described. A 2D image signal means an image signal received via the conventional digital TV channel, is coded into MPEG-2 video and is coded using AVC/H.264 or another codec according to circumstances. The method of receiving the 2D image signal is equal to the conventional digital TV service reception method and information such as presence of enhancement data, a combined service form, a reception channel/path or an acquirable time is confirmed using a PSI/PSIP/SI section received via this channel.

Enhancement data means depth map or disparity map data in the present invention. According to circumstances, the enhancement data may include occlusion and transparency information and is hereinafter referred to as depth map for convenience. The 3D image signal reception device couples a 2D image signal received via c conventional channel and enhancement data to generate another view configuring a 3D stereoscopic image signal. The enhancement data is coupled using a real-time coupling method or a non-real-time coupling method.

First, in the real-time coupling method, the 2D image signal is received via the conventional channel and, at the same time, the enhancement data is received via the Internet or another terrestrial channel. At this time, the two components provide a real-time 3D image to a viewer through real-time reception and real-time decoding.

In the non-real-time coupling method, enhancement data is previously received via the Internet or a terrestrial channel and is stored in a memory before a broadcast time of a 2D image signal. Both an NRT method and a method of recording live enhancement data are possible. If the 2D image signal starts to be broadcast via the conventional channel, synchronization with the 2D image signal received while playing the previously recorded/stored enhancement data back is performed to output a 3D image. That is, an actual broadcast is a 2D live broadcast, but a reception device which previously receives enhancement data may provide a 3D live image.

If two or more enhancement data streams are transmitted, a depth range suiting viewer's taste may be selected using disparity_near and disparity_far fields of each stream. That is, depth control can be implemented through selective reception of multiple depth maps and 3D rendering using a received depth map.

MODE FOR INVENTION

Various embodiments have been described in the best mode for carrying out the invention.

INDUSTRIAL APPLICABILITY

The present invention is wholly or partially applicable to a digital broadcast system, as described above.

The invention claimed is:

1. A digital broadcast signal reception device for providing a three-dimensional (3D) stereoscopic image, comprising:
   a tuner configured to receive a first signal including a video stream of a base view and signaling data via a first channel of a broadcast network and a third signal including a video stream of an enhancement view via a second channel of the broadcast network;
   a signaling data processor configured to decode the signaling data,
   wherein the signaling data includes information about the video stream of the enhancement view,
   wherein the enhancement view is a 3D video component being used to add to the base view to compose 3D video,
   an internet access processor configured to receive a second signal including the video stream of the enhancement view by using the signaling data via an internet network;
   a base video decoder configured to decode the received video stream of the base view;
   an enhancement video decoder configured to decode the received video stream of the enhancement view; and
   an output formatting processor configured to couple the decoded base view and the decoded enhancement view based on sync information, and to output the 3D stereoscopic image,
   wherein the first signal, the second signal and the third signal include the sync information,
   wherein the sync information provides information to be used for a synchronization between the base view and the enhancement view,
   wherein the first channel of the broadcast network transmits the base view in real time,
   wherein the second channel of the broadcast network transmits the enhancement view in non-real time,
   wherein the internet network transmits the enhancement view in real time or non-real time,
   wherein the signaling data further includes type information indicating whether the enhancement view is transmitted via the second channel of the broadcast network or the internet network.

2. The digital broadcast signal reception device according to claim 1,
   wherein the sync information includes frame information indicating a frame number of the video stream.

3. The digital broadcast signal reception device according to claim 1, wherein the signaling data includes information about a time when the video stream of the enhancement view is received.

4. A digital broadcast signal reception device for providing a three-dimensional (3D) stereoscopic image, comprising:
   a tuner configured to receive a first signal including a video stream of a base view and signaling data via a first channel of a broadcast network and a third signal including a video stream of an enhancement view via a second channel of the broadcast network,
   wherein the signaling data includes information about depth data of an enhancement view,
   wherein the enhancement view is a 3D video component added to the base view to compose 3D video;
   a base video decoder configured to decode the received video stream of the base view;
   an internet access processor configured to receive a second signal including the depth data of the enhancement view by using the signaling data via an internet network;
   a depth data decoder configured to decode the received depth data;
   a synchronizing processor configured to synchronize the base view and the decoded depth data;
   a rendering processor configured to render the enhancement view using the output of the synchronizing processor; and
   an output formatting processor configured to couple the decoded base view and the decoded enhancement view based on sync information, and to output the 3D stereoscopic image,
   wherein the first signal, the second signal and the third signal include the sync information,
   wherein the sync information provides information to be used for a synchronization between the base view and the enhancement view,
   wherein the first channel of the broadcast network transmits the base view in real time,
   wherein the second channel of the broadcast network transmits the depth data of the enhancement view in non-real time,
   wherein the internet network transmits the depth data of the enhancement view in real time or non-real time,
   wherein the signaling data further includes type information indicating whether the depth data of the enhancement view is transmitted via the second channel of the broadcast network or the internet network.

5. The digital broadcast signal reception device according to claim 4, further comprising a content and metadata memory configured to store and provide the received depth data when necessary.

6. The digital broadcast signal reception device according to claim 4, wherein the digital broadcast signal reception device receives a plurality of pieces of depth data in order to provide a 3D image having various depth ranges.

7. A digital broadcast signal reception method for providing a three-dimensional (3D) stereoscopic image, comprising:
   receiving a first signal including a video stream of a base view and signaling data via a first channel of a broadcast network;
   decoding the signaling data,
   wherein the signaling data includes information about a video stream of an enhancement view,
   wherein the enhancement view is a 3D video component added to the base view to compose 3D video;
   receiving a second signal including the video stream of the enhancement view using the signaling data via an internet network or a second channel of the broadcast network;
   decoding the received video stream of the base view;
   decoding the received video stream of the enhancement view; and coupling the decoded base view and the decoded enhancement view based on sync information, and outputting the 3D stereoscopic image, wherein the first signal and the second signal include the sync information, wherein the sync information provides information to be used for a synchronization between the base view and the enhancement view, wherein the first channel of the broadcast network transmits the base view in real time, wherein the second channel of the broadcast network transmits the enhancement view in non-real time, wherein the internet network transmits the enhancement view in real time or non-real time, wherein the signaling data further includes type information indicating whether the enhancement view is transmitted via the second channel of the broadcast network or the internet network.

8. The digital broadcast signal reception method according to claim 7, wherein the sync information includes frame information indicating a frame number of the video stream.

9. The digital broadcast signal reception method according to claim 7, wherein the signaling data includes information about a time when the video stream of the enhancement view is received.

10. A digital broadcast signal reception method for providing a three-dimensional (3D) stereoscopic image, comprising:

receiving a first signal including a video stream of a base view and signaling data via a first channel of a broadcast network, wherein the signaling data includes information about depth data of an enhancement view, wherein the enhancement view is a 3D video component added to the base view to compose 3D video;

decoding the received video stream of the base view;

receiving a second signal including the depth data of the enhancement view using the signaling data via an internet network or a second channel of the broadcast network;

decoding the received depth data;

synchronizing the base view and the decoded depth data;

rendering the enhancement view using the output of the synchronizing; and coupling the decoded base view and the decoded enhancement view, and outputting the 3D stereoscopic image, wherein the first signal and the second signal include sync information, wherein the sync information provides information to be used for a synchronization between the base view and the enhancement view, wherein the first channel of the broadcast network transmits the base view in real time, wherein the second channel of the broadcast network transmits the depth data of the enhancement view in non-real time, wherein the internet network transmits the depth data of the enhancement view in real time or non-real time, wherein the signaling data further includes type information indicating whether the depth data of the enhancement view is transmitted via the second channel of the broadcast network or the internet network.

11. The digital broadcast signal reception method according to claim 10, further comprising storing and providing the received depth data when necessary.

12. The digital broadcast signal reception method according to claim 10, wherein the digital broadcast signal reception method receives a plurality of pieces of depth data in order to provide a 3D image having various depth ranges.

* * * * *